(12) United States Patent
Livingston

(10) Patent No.: US 6,894,303 B2
(45) Date of Patent: May 17, 2005

(54) METHOD AND APPARATUS FOR RADIOGRAPHIC IMAGING

(75) Inventor: Troy W. Livingston, Northbrook, IL (US)

(73) Assignee: Essex Electro Engineers, Inc., Schaumburg, IL (US)

( * ) Notice: Subject to any disclaimer, the term of this patent is extended or adjusted under 35 U.S.C. 154(b) by 357 days.

(21) Appl. No.: 10/302,018

(22) Filed: Nov. 22, 2002

(65) Prior Publication Data

US 2003/0132395 A1 Jul. 17, 2003

Related U.S. Application Data

(63) Continuation-in-part of application No. 10/281,822, filed on Oct. 28, 2002, which is a continuation-in-part of application No. 09/990,164, filed on Nov. 21, 2001, now Pat. No. 6,696,698, which is a continuation-in-part of application No. PCT/US01/20481, filed on Jun. 27, 2001, which is a continuation-in-part of application No. 09/721,014, filed on Nov. 22, 2000, now Pat. No. 6,555,838.
(60) Provisional application No. 60/214,930, filed on Jun. 29, 2000.

(51) Int. Cl.$^7$ .......................... G03B 42/08; G03B 42/02

(52) U.S. Cl. ....................... 250/585; 250/584; 250/586

(58) Field of Search ................................ 250/585, 584, 250/586, 582

(56) References Cited

U.S. PATENT DOCUMENTS

| | | | | |
|---|---|---|---|---|
| 4,343,991 A | * | 8/1982 | Fujiwara et al. | 250/227.11 |
| 4,409,477 A | * | 10/1983 | Carl | 250/227.26 |
| 4,950,895 A | * | 8/1990 | Reinfelder | 250/585 |
| 5,087,937 A | * | 2/1992 | Frick et al. | 355/1 |
| 5,408,093 A | * | 4/1995 | Ito et al. | 250/227.26 |
| 6,696,698 B2 | * | 2/2004 | Livingston | 250/584 |

FOREIGN PATENT DOCUMENTS

| | | | | | |
|---|---|---|---|---|---|
| JP | 60093425 A | * | 5/1985 | | G03B/42/02 |
| JP | 03080240 A | * | 4/1991 | | G03B/42/02 |

* cited by examiner

Primary Examiner—Albert Gagliardi
(74) Attorney, Agent, or Firm—Fitch, Even, Tabin & Flannery

(57) ABSTRACT

An apparatus and method for computed radiography includes a rotating laser as a pumping source for delivering light, without the use of a rotating mirror, successively to ends of each of a plurality of optical fibers arranged in an arc. Opposite ends of the optical fibers are arranged in a linear array to a previously-exposed computed radiography plate having a latent X-ray image formed thereon. The plate is moved with respect to the fibers. Light emitted from the radiographic medium due to excitation by the pumping light travels through a light guide to an optical receiver where an image signal responsive to the light intensity of the emitted light is generated. The image signal is sent to a processor to generate an image representative of the latent X-ray. An erasing of the latent x-ray image may be accomplished in the same machine apparatus that generates the representative image. Preferably, multiple erasure operations are performed with a relaxation period, e.g., three to ten seconds between successive erasing operations. The laser is accurately positioned by an adjustment mechanism in an axial direction to focus the laser light on receiving optical fiber ends and in a radial direction to align the rotational axis substantially coaxially to the axis of the arc for the optical fibers. Electrical power is delivered through a brush and contact to leads in a rotating drive shaft for the rotating laser. The preferred light guide comprises an inlet positioned to receive phosphorescent light from the imaging plate and rearward and forward reflective surfaces for reflecting incoming light back and forth within the light guide that was not directly aligned for travel along a straight line path directly to the light collector, e.g., a photomultiplier tube. A substantial portion of this reflected light will eventually travel forwardly along a path of travel to hit the photomultiplier tube.

15 Claims, 17 Drawing Sheets

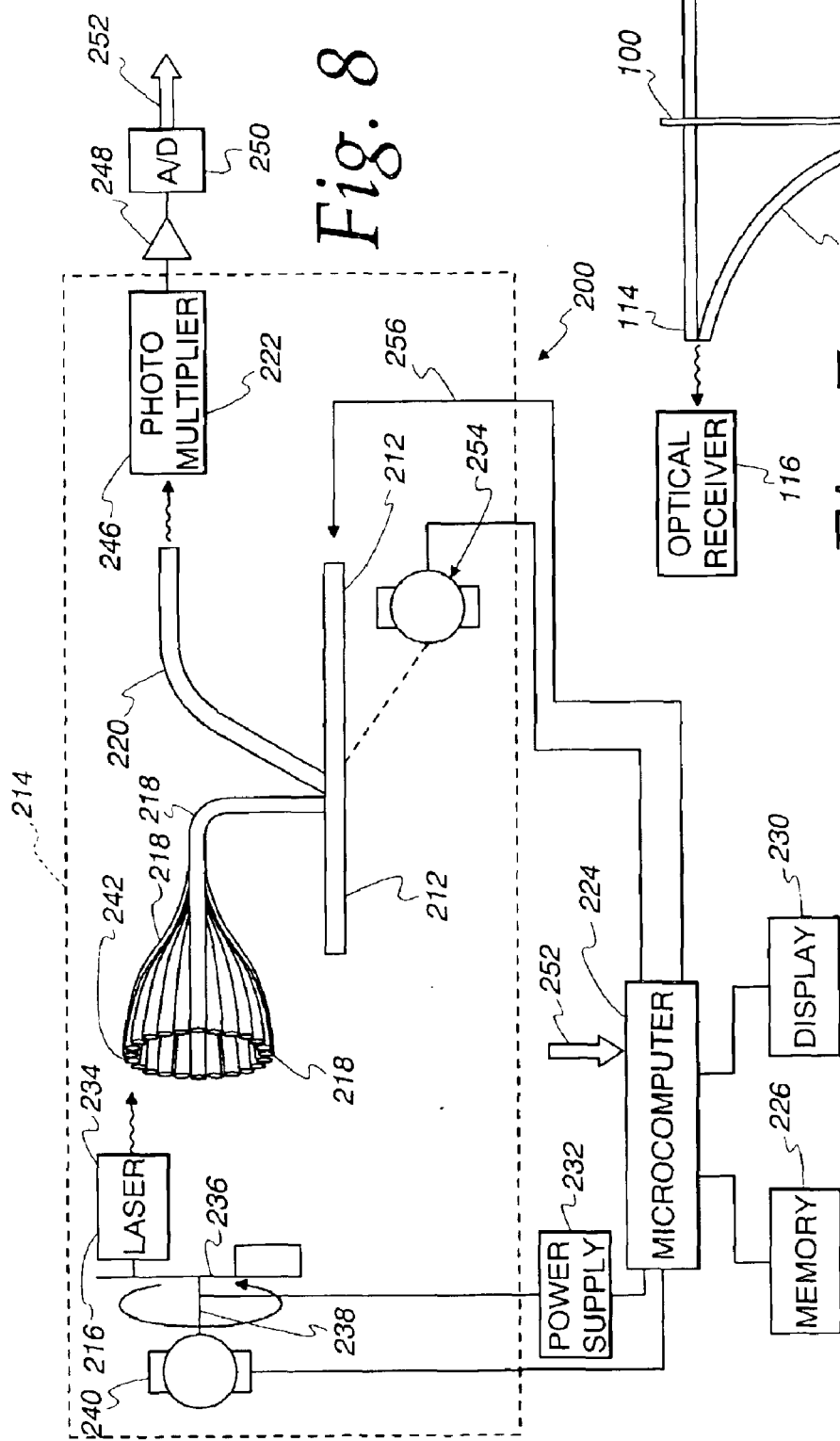
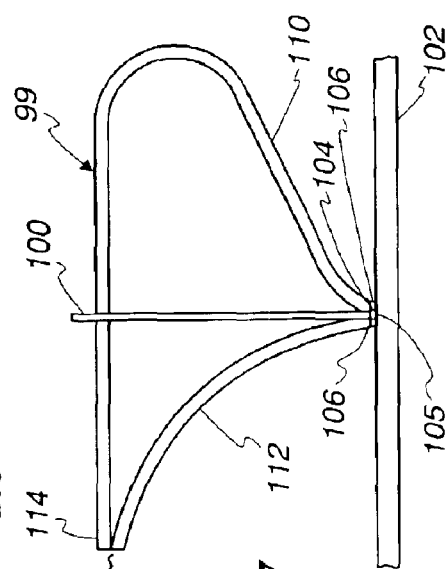
Fig. 7
Fig. 8

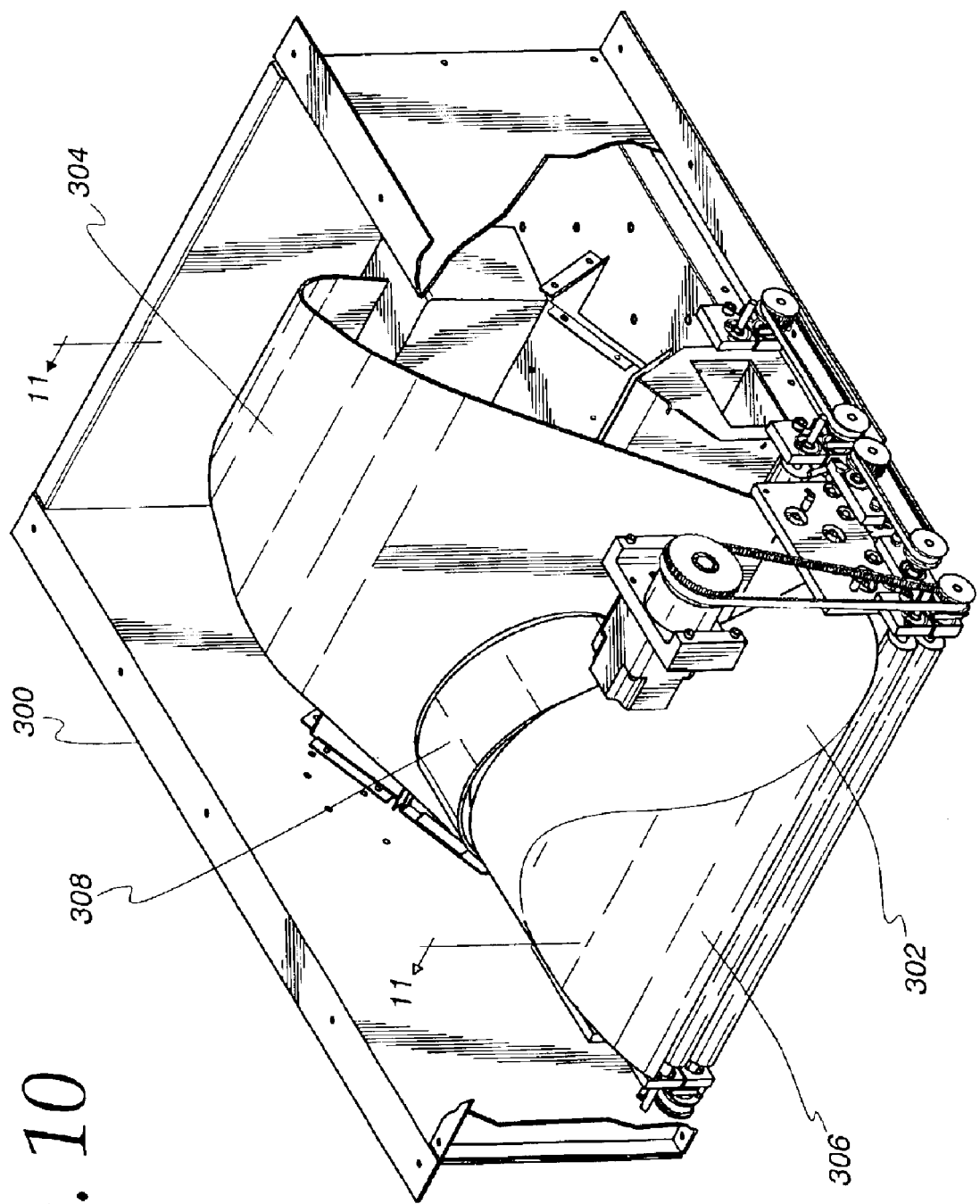

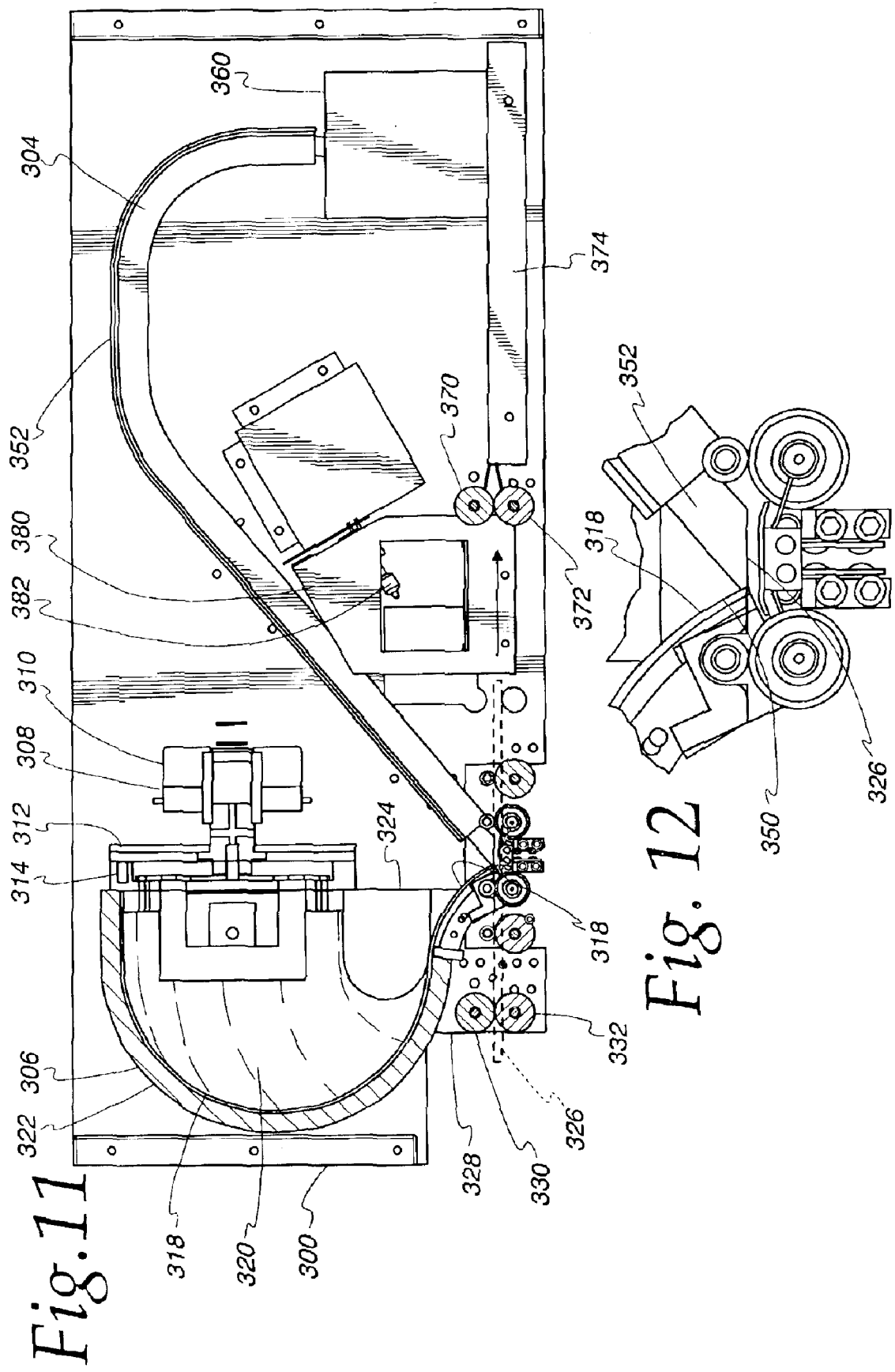

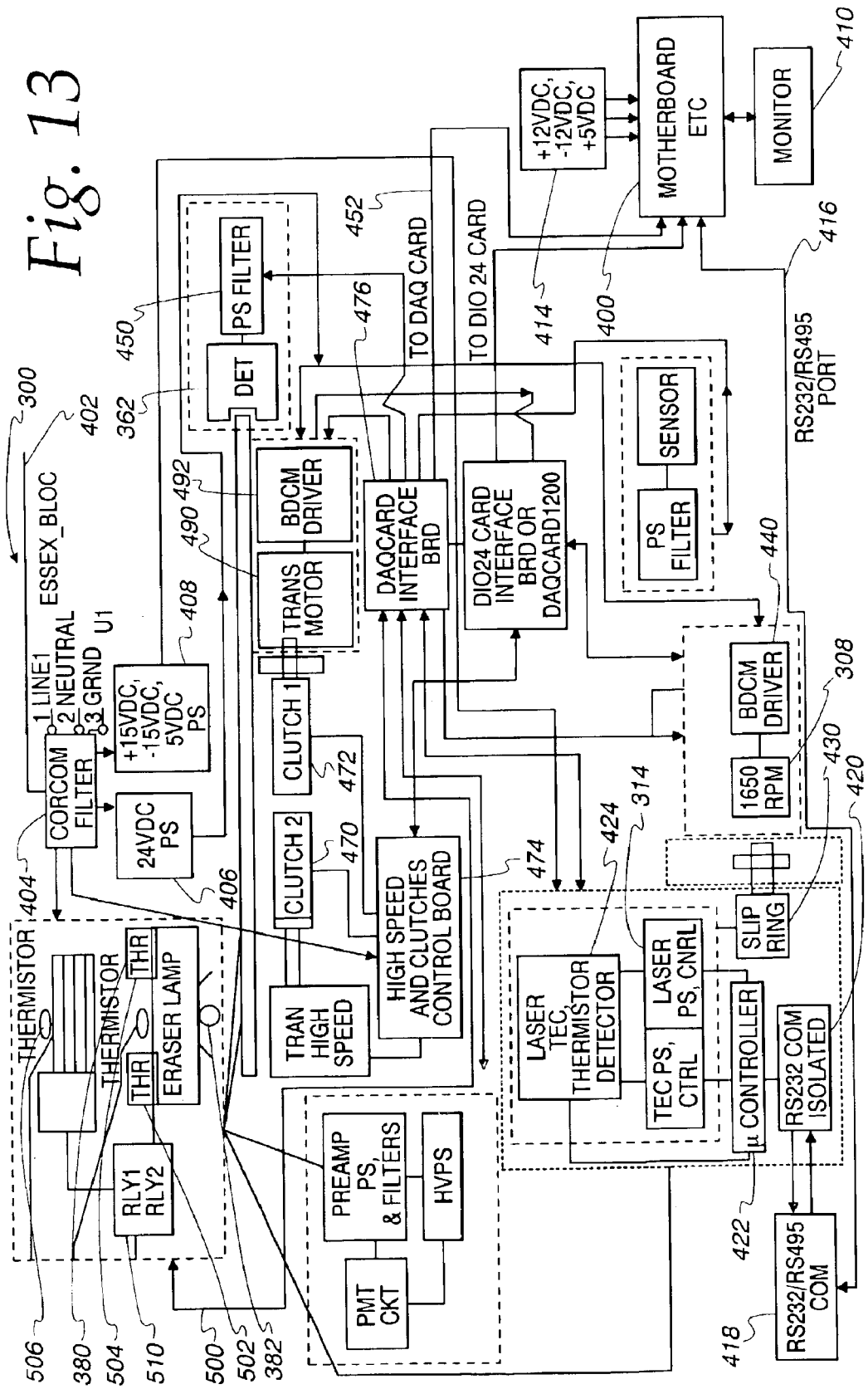

METHOD AND APPARATUS FOR RADIOGRAPHIC IMAGING

CROSS REFERENCE TO RELATED APPLICATIONS

This is a continuation-in-part of U.S. patent application Ser. No. 10/281,822 filed Oct. 28, 2002, which is a continuation-in-part of U.S. patent application Ser. No. 09/990,164, filed Nov. 21, 2001, now U.S. Pat. No. 6,696,698 which is a continuation-in-part of International Application No. PCT/US01/20481, filed Jun. 27, 2001, designating the United States of America, which is a continuation-in-part of U.S. patent application Ser. No. 09/721,014, filed Nov. 22, 2000, now U.S. Pat. No. 6,555,838 which claimed priority from U.S. Provisional Patent Application No. 60/214,930, filed Jun. 29, 2000. International Application No. PCT/US01/20481 filed Jun. 27, 2001 also claimed priority from U.S. Provisional Patent Application No. 60/214,930, filed Jun. 29, 2000.

BACKGROUND OF THE INVENTION

The invention generally relates to radiographic imaging and, more particularly, relates to a method and apparatus for reading a computed radiography phosphor plate or sheet that has been exposed by x-rays by supplying pumping light thereto.

It is well known that, by using x-ray systems, features can be visualized within the human body or within industrial products, or the like. Current X-ray systems often use x-ray film which must be developed.

In the alternative, computed tomography installations are available but are very expensive and require large amounts of computer power.

In addition systems exist which use a technique called computed radiography. A patient or object is exposed with x-rays and a latent x-ray image is formed on a phosphor-containing computed radiography plate or sheet that is similar to a sheet of film. The phosphor-containing sheet typically may include a rare earth, such as europium, in combination with barium and fluorine. Other sheet formulations also are available. The sheet is sensitive to x-rays and can store latent x-ray image thereon. Because the sheet is also sensitive to light it is kept in the dark. A sheet containing a latent x-ray image is imaged in a scanner by exposing the sheet and its latent image to a raster-scanned laser beam. Areas of the sheet which have preferentially received x-ray energy phosphorus, making the latent X-ray image visible.

While the scanner is convenient and allows reuse of the computed radiography sheets multiple numbers of times, it does suffer from certain drawbacks. It is difficult to obtain a high-spatial resolution image because the pumping laser beam, although only covering a small spot-size at a time, tends to leave illumination energy behind, which causes bloom; thereby smearing the image and reducing its resolution. This is because the image is built up in the way that an image would be in a flying spot device wherein only a single optical detector is used. The single optical detector can capture radiation from almost any position on the sheet. The optical detector, however, is unable to determine whether the photons it is receiving are coming from unwanted bloom or coming from active phosphorescence caused by excitation by the laser beam.

The prior raster-scanned laser systems introduce spatial non-linearities in the image for which there must be compensation. The non-linearities are due to the difference in the effective beam scan rate when the beam is substantially perpendicular to the latent image containing sheet at the center portion of the sheet and when it is sweeping at an angle to the sheet near the sheet edges. As a result, since the image is constructed based upon on pumping beam timing and orientation, elaborate methods would have to be used in order to effectively relinearize the beam scan to provide an undistorted image.

U.S. Pat. No. 4,737,641 discloses an apparatus for producing x-ray images by computer tomography using a high energy excitation beam such as a red laser beam which is focused on the storage plate by suitable optics and the beam is deflected across a line of the plate by a rotating mirror. The storage plate is shifted in steps relative to the fan of the laser beam so that the entire image is read line-by-line by the x-ray beam. The photo-stimulated luminescence is successively supplied point-by-point to a common photomultiplier and then to an amplifier via a light conductor comprising a plurality of optical fibers. The emissions are connected into electrical signals are supplied to analog-to-digital converters and a computer forms an image that is visible on a display unit.

A particular problem with systems using the rotating mirror to deflect the laser beam across the line is that vibrations jiggle the mirror and cause a loss of sensitivity or tolerance. An acceptable tolerance is often only 0.004 inch which can be a problem when the mirror is being vibrated. Further, these rotating mirror and focusing lens systems require a light-sealed, large volume or space within an enclosed housing. Further, such systems may be too delicate to be used in the field such as for military x-rays of wounded soldiers or for being carried into remote rugged locations for non-military use. Thus, there is a need for a smaller and more rugged apparatus for producing x-ray images by computer tomography.

One of the particular problems of a rotating laser used in a radiographic imaging and computed radiographic phosphor plate system is that the rotating laser must be accurately positioned and kept in its exact position as it is rotated at high speed, for example, 6600 rpm. Thus the laser, which is experiencing considerable G-forces, must be locked in an exact position to keep its focus with respect to the circular or arcuate array of fiber ends to which it is supplying a beam of light. In addition to being locked in position it is important that the laser also be adjusted so that it can be positioned quite accurately and focused both radially so that the axis of rotation of the laser is substantially matched and co-axial with the axis of the circular array of fiber ends. Also, there is a need for an axial focus adjustment to shift the laser in the axial direction towards or from the fiber ends to make sure that the beam is focused properly on the fiber ends. Typically, X and Y-track systems for shifting an element such as a laser head do not have a zero backlash which is desirable to prevent slop or movement and creep of the laser beam out of focus. Additionally, typical X and Y-tracks are relatively large and expensive and they are to heavy to be rotated at high speed, for example, the 6600 rpm rotational velocity of the laser head in the illustrated embodiment. Thus there is a need for an adjustment device for locking the laser in its focused and adjusted position which is capable of being rotated with the laser head.

Another problem with the use of a rotating laser and a computer tomography, x-ray imaging system is that the power must be delivered to the laser which is also provided with a power supply and a thermal control. The power being supplied must allow the laser to be electrically insulated from the support with the laser being grounded. It will be appreciated that the electrical power system for the rotating laser head should be relatively inexpensive and simple and have a relatively long life because the laser head that is rotating at high speed, for example, at 6600 rpm.

What is needed, then, is a system and apparatus which can quickly and conveniently provide highly-accurate and high resolution computed radiography visible images without the need for expensive equipment.

SUMMARY OF THE INVENTION

In accordance with the illustrated embodiment, a new and improved method and apparatus for radiographic imaging rotates a laser directly rather than using rotating mirrors as in the prior art. The use of the rotating laser to deliver the light directly to transmit fiber ends allows light to move across the fiber ends in a generally straight line path rather than in a sinusoidal path emanating from a rotating mirror as in prior art radiographic imaging systems. In the illustrated embodiment, a thin, straight line of laser pumping light is tilted across multiple fiber ends. For example, the tiled, thin line of pumping light illuminates a small area on a first fiber end on an upstream side of a central fiber which is receiving the most light over its fiber end and while the downstream or trailing fiber is receiving light over only a small area. The tilted line of pulsing light extends both beyond and below the theoretical circle defined by the optical fiber ends such that those fiber ends located at a radius slightly greater or slightly less than the nominal radius for the circle are also illuminated. Thus, there are no dead spots caused by the fiber ends that are located at the nominal radius, which dead spots could cause a loss of resolution and interfere with electronic signal making for measuring the emanated light. Also, the illumination of multiple optical fibers ends assures that no dead spot occurs when the laser light shifts from one fiber end to the next succeeding fiber end. This results in an illumination of the imaging plate and phosphorescent light therefrom that produces signals with low noise as well as eliminate sensitivity and other problems associated with rotating mirrors.

In accordance with an important aspect, a new and improved light guide is provided for collecting light and transfer light emanating from phosphorescence at the imaging plate. The light collecting efficiency is relatively high in that many of the photons that are not directly aimed at the surface of the multiplier tube are reflected back and forth along different paths until many of them hit the photomultiplier tube. In the illustrated embodiment, the light tube has a narrow area entrance slit to allow entry of photons aimed directly at the photomultiplier tube as well as those photons aimed outside of the area of the photomultiplier tube. Those photons traveling through the slit along a path outside of the area of the light receiver, e.g., a photomultiplier tube, in this instance, strike a reflective surface and are reflected rearward toward the front, entry end of the light tube and another reflective surface reflects the photon to reverse to travel in the forward direction again but along a different path of travel. That is, the reflective surfaces may be inclined so that the photons reversing their travel directions will, for the most part, travel along different paths until they travel along a path aligned to bring them to the photomultiplier tube. The area of the photon entry slit may be quite small, e.g., about 7 percent or less of the area of the front end of the light tube such only a small portion of the reflected photons is lost by traveling in a reversed backward direction to exit the light pipe at the entry slit at its front end. Because the fiber end supplying the laser light to the imaging plate is small, e.g., only about 0.002 in diameter, the phosphorescent light spot emanating from the imaging plate is also small. In one example of the light pipe, the entry or light input may be about 0.040 inches in height with a 0.625 inch high, front reflective surface with the light pipe extending for one unit, which in this instance, is about 4.3 inches. This size is a multiple where four units can be used for a 17 inch wide image plate and two units can be used for an eight inch imaging plate.

In accordance with an embodiment, the laser beam is focused on the optical fiber ends by an adjustment mechanism that moves the laser closer or farther from the fiber ends, as needed. Further, the laser is locked in its focused position by the mechanism without backlash or creeping that would interfere with the focus when rotating at high speeds, e.g., 6600 rpm or when impacted. Further, the adjustment mechanism does not employ the very expensive and heavy X and Y-slides that also have play or backlash. Moreover, the laser may be adjusted in a radial direction to match its light beam with the radial location of the optical fiber ends. Stated differently, the circle of rotation of the laser beam can be adjusted to match the circle defined by the optical fiber ends. Herein, the adjustment mechanism comprises a pair of finely threaded shafts with one shaft being threaded to be perpendicular to a rotating carrier plate to swing a laser mounting plate about the other screw to shift the laser toward or from the optical fiber ends to focus light beams on the fiber ends. The other shalt can be held at one end and turned at its released end to pivot the laser mounting plate to swing the laser mounting plate and laser in a radially outward direction to increase the radius of circular path of the laser beam. Conversely, to reduce this radius, the one end of the other shaft can be loosened and the shaft turned in a nut on the laser mounting plate to shift the laser radially inward with the laser mounting pivoting about the first threaded shaft. Both of the shafts are locked in position by a set screw or the like so that there is no play or backlash. Herein, the adjustments are small and are less than about 0.030 to 0.040 inch.

BRIEF DESCRIPTION OF THE DRAWINGS

FIG. 7 is a sectional view of an alternative apparatus embodying the present invention;

FIG. 8 is a schematic diagram of another alternative embodiment of the present invention;

FIG. 10 is another perspective view of an apparatus shown in FIG. 9;

FIG. 11 is a section taken substantially along line 11—11 of FIG. 10;

FIG. 12 is a section of a portion of the apparatus shown in FIG. 9 showing details of transmit optical fibers and a receive light pipe in proximity with a CR plate being read;

FIG. 13 is a block diagram of the apparatus shown in FIG. 9;

DETAILED DESCRIPTION OF THE PREFERRED EMBODIMENTS

Figure 1:
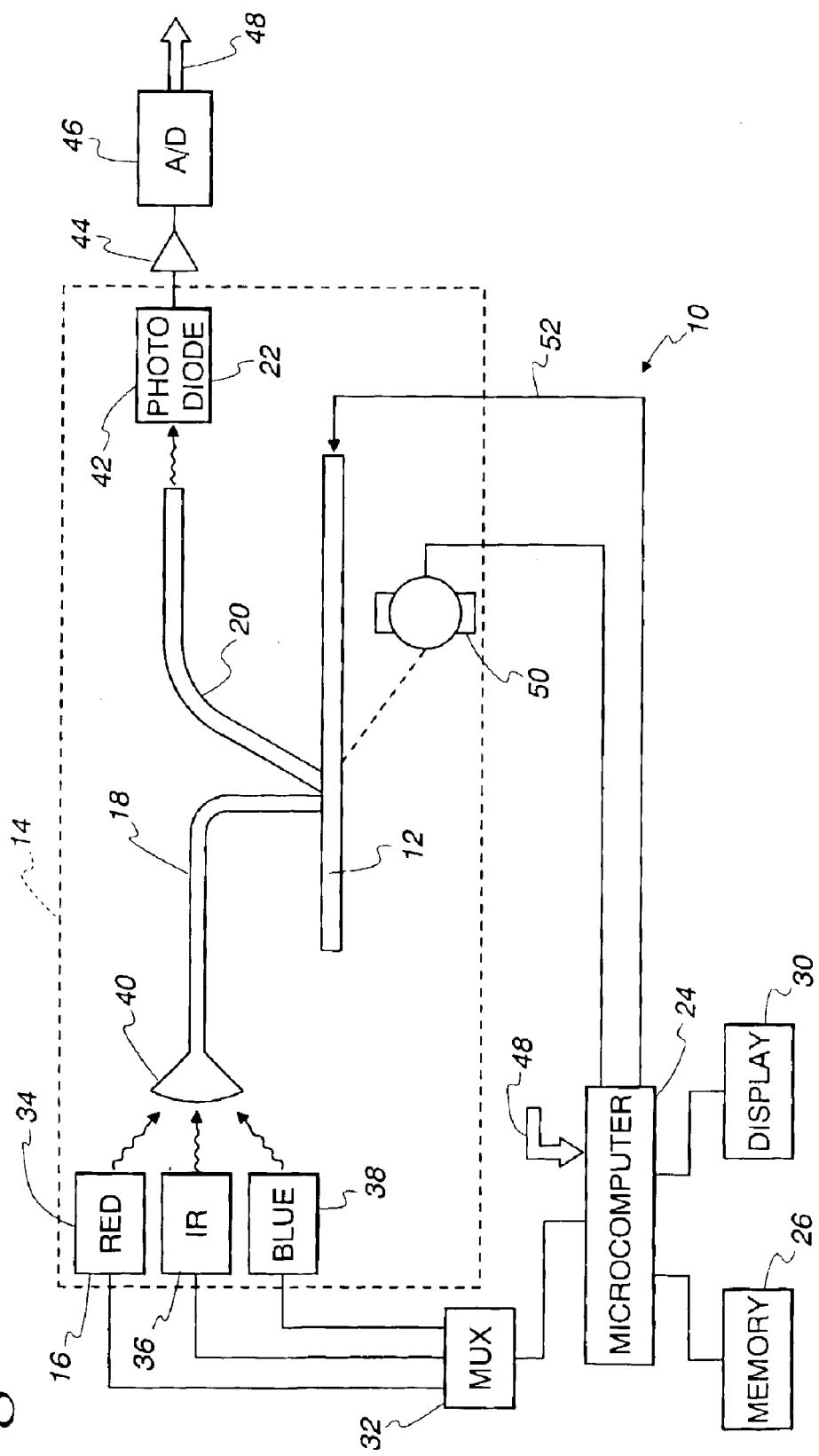
FIG. 1 is a block diagram of an apparatus comprising a computed radiography plate scanner and embodying the present invention.

Referring now to the drawings and especially to FIG. 1, an apparatus embodying the present invention and generally identified by reference numeral 10 is shown therein. The apparatus 10 comprises a computed radiography plate scanner for use in scanning an exposed computed radiography plate 12, which may be a computed radiography plate or a computed radiography sheet. The computed radiography plate scanner 10 produces a visible image of the latent x-ray image stored on the computed radiography plate 12. The computed radiography plate or sheet 12 is normally held in a light-tight cassette but is removable from the cassette for reading or scanning.

Figure 2:
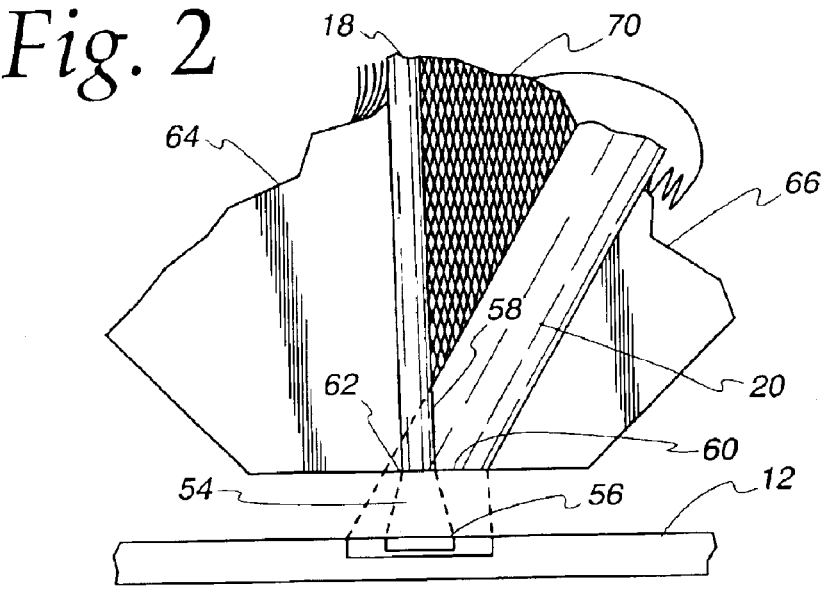
FIG. 2 is a detailed view of an orientation of a transmitting fiber and a receiving fiber of the apparatus shown in FIG. 1.
Figure 3:
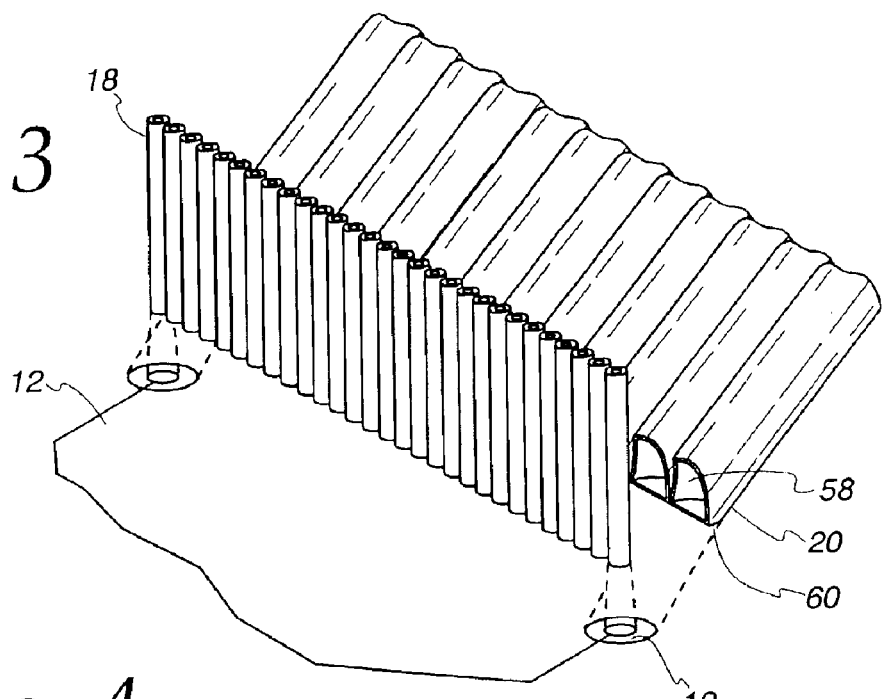
FIG. 3 is an exploded perspective view of the apparatus shown in FIG. 1 showing details of a transmitting optical fiber array and a receiving optical fiber array positioned over a computed radiography plate.
Figure 4:
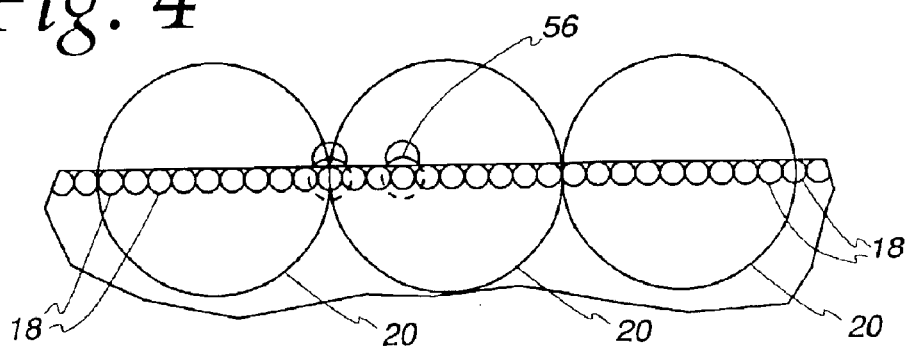
FIG. 4 is a diagrammatic view of a layout of the transmitting optical fibers with respect to larger receiving optical fibers of the apparatus shown in FIG. 1.
Figure 5:
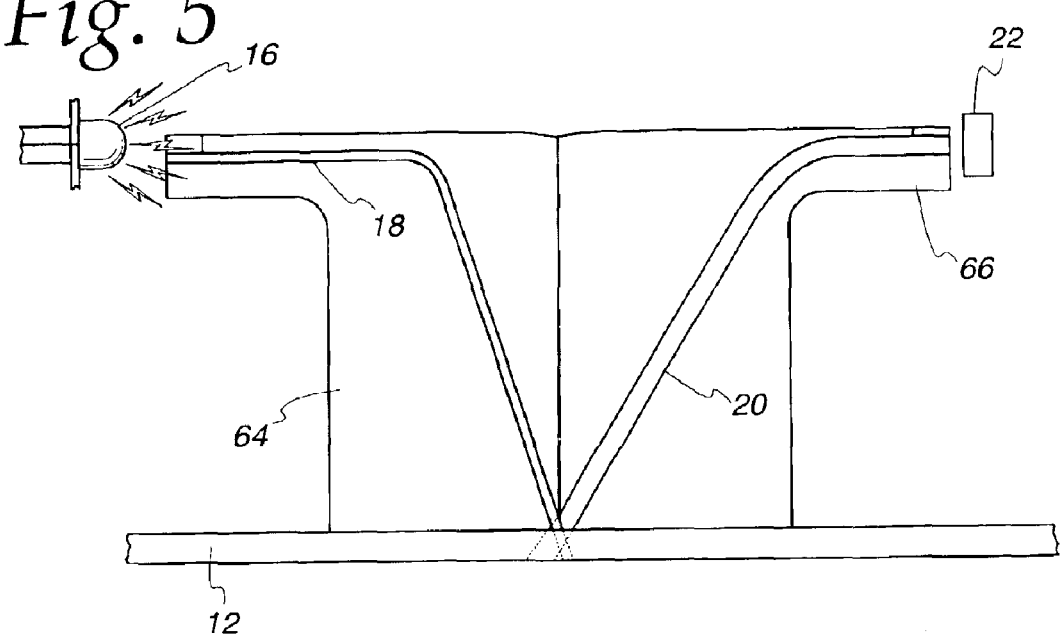
FIG. 5 is a sectional view of the apparatus shown in FIG. 1 shown partially in schematic and showing a light path through the apparatus.
Figure 6:
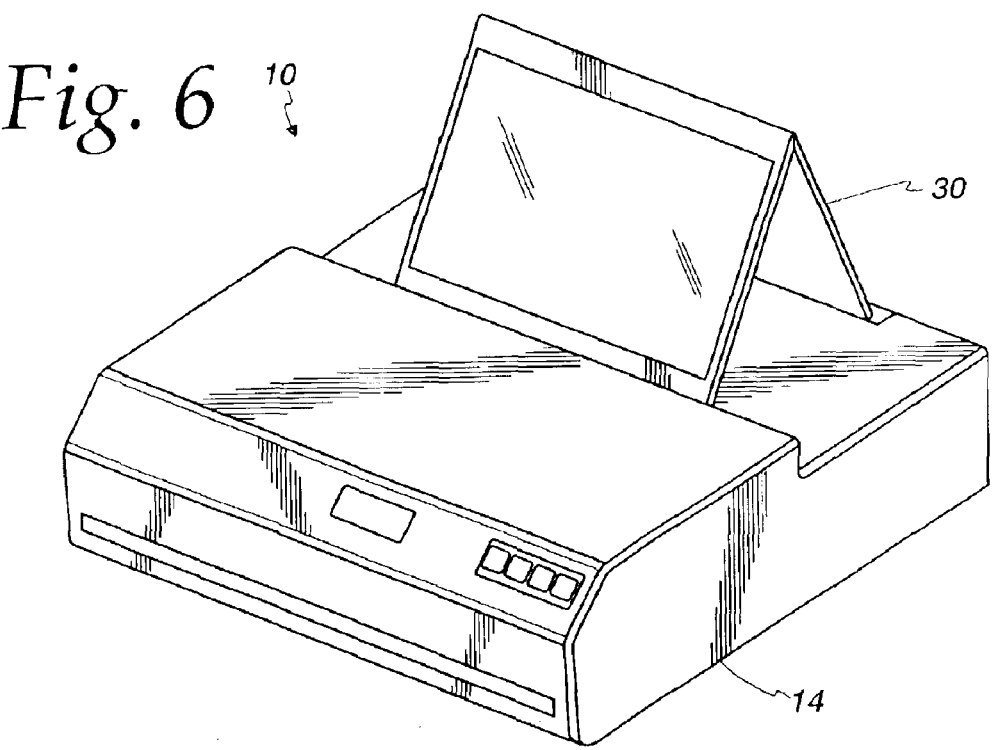
FIG. 6 is a perspective view of the apparatus shown in FIG. 1.

The apparatus 10 comprises a light-tight enclosure 14 for holding the computed radiography plate 12 during scanning. An optical pump source 16 which may be LEDs in one embodiment or a laser pumping light source 216 (FIG. 8) in another embodiment produces pumping light to be delivered to the computed radiography plate 12 in order to generate phosphorescence in response to a latent x-ray image formed therein. The pumping light is carried from the optical pump source 16 through a plurality of transmit optical fibers 18 to the vicinity of the substrate 12. In the embodiment of FIGS. 20–25, a light guide 650 (FIG. 20) receives localized light produced by phosphorescence from the optical pumping source 16 and delivers that phosphorescent light to an optical receiver 22. In the embodiment of FIGS. 2 and 3, a plurality of optical fibers 20 may be used to deliver phosphorescent light to the optical receiver 22. The optical receiver 22 converts the received phosphorescent light from the second fiber array 20 to an electrical signal which is supplied to a processor 24. The processor 24, in conjunction with a memory 26, generates a display of the latent image formed on the computed radiography plate 12 by previous X-ray exposure.

A housing 28 holds and defines the light-tight enclosure 14. Within the housing 28 is the processor 24 which is more specifically a microprocessor or a microcomputer. A display 30 is connected to the processor 24 to provide a visual readout to a user. The processor 24 preferably may be a microprocessor or a microcomputer The processor 24 controls operation of the optical pump source 16 via a multiplexer 32. The multiplexer 32, under the control of the processor 24, selectively energizes a red pumping light emitting diode 34, an infrared pumping light emitting diode 36 or a blue light-emitting diode 38 of the optical pump source 16, either one at a time or simultaneously. This is done in order to transmit pumping light or calibrating light to a lensing body 40 of one of a 25–65 micron optical fiber of the plurality of transmit optical fibers 18 for delivery of pumping light to the computed radiography substrate 12. Received light creates phosphorescence at a pixel on the plate 12 which was exposed to X-rays and is carried by the light guide 650 (FIG. 20) to the optical receiver 22, which comprises a photodiode 42. The photodiode 42 converts the phosphorescent light to an electrical image signal. In the first described embodiment receive fibers 20 are described rather than the light pipe 650. The receive fibers 20 work but are very difficult to manufacture in proper aligned position with respect to aligning their ends with ends of the transmit fibers 18. Hence, the light pipe 650 is preferred to be used in all embodiments described herein.

An operational amplifier 44 amplifies the electrical image signal and feeds an amplified analog received phosphorescent light signal to an analog-to-digital converter 46 which provides a digital output signal. The digital output signal is on a bus 48 indicative of the spot density or spot intensity. In addition, the computed radiography plate or sheet 12, which is held within the light-tight enclosure 14, is moved by a stepper motor 50, under the control of the processor 24, past the optical fiber arrays 18 and light guide 650 to cause the plate 12 to be scanned. The processor 24 then provides output signals on an output position bus 52 indicative of the position being read on the sheet 12. The position is indicated both transversely with respect to the optical array 18, and longitudinally with respect to the travel of the sheet 12.

The method and the apparatus in the FIG. 1 embodiment employs multiple light emitting diodes, one of which can emit light having a wavelength of 940 nanometers or in the near-infrared region. The second diode, emits light having a wavelength between 630 and 650 nanometers in the red region. The third diode emits light in the blue region. The diodes are each coupled to a separate 65 micron, outer diameter clad optical fiber having an inner core diameter of 44 microns, which are used as a transmission fiber. The transmission fiber delivers the infrared, the red, or the blue light to the computed radiography plate 12, as may best be seen in FIG. 2. It is preferred to use, if available, 25 to 65 micron clad fibers 18 extends substantially perpendicular to the computed radiography plate 12 and emits a fan-like beam 54 of infrared or red light which strikes the computed radiography plate 12 at a spot 56. The area immediately around the spot 56 is excited by the pumping light and emits light by phosphorescence. The amount of phosphorescent light emitted is dependent upon the amount of X-ray energy stored at the point on the computed radiography plate 12.

The phosphorescent light is collected by a clad optical receive fiber 20 which extends away from the plate 12. It is preferred to use a 65 outer diameter micron clad diameter clad receive fiber 20, if available. Currently, manufacturers only supply fibers with about a 44 micron core and about a 33 micron polyamide cladding or coating about the core resulting in a 65 to 67 micron fiber. The receive fiber 20 has a vertical matching face 58 and a light receiving face 60 to allow a lensing region 62 of the transmit fiber 18 to be positioned very close to the collection face 60 of the receive fiber 20 to provide extremely high image resolution. The transmit fiber 18 is one of approximately 8,000 transmit fibers, as may best be seen in FIG. 3. The transmit fibers 18 each may be separately excited by a light-emitting diode.

The plurality of transmit fibers 18 is supported by an aluminum transmit base plate or support bar 64, in order to maintain the fibers 18 in registration and in linearity so that they will be positioned a relatively short distance above the computed radiography plate 12. The computed radiography plate 12 is moved by the stepper motor underneath the fiber arrays 18 and 20 allowing rapid scanning of the computed radiography plate 12. In addition, the receive fibers 20 are supported by a receive fiber plate or support arm 66, which is composed of aluminum.

Another advantage of the embodiment of FIGS. 2 and 3 is that through the use of LEDs to provide pumping light, the pass bands are broad enough that they need not be specifically tuned to a specific frequency. The broad band LED outputs transfer energy to which the various computed radiography plates are sensitive. In addition, the transmit and receive optical fiber arrays 18 and 20 can be calibrated by providing blue light through the transmitting fibers 18 and then collecting the light through the receive fibers 20 to determine the exact registration of the blue light which is being provided to the computed radiography plate 12.

In effect, three LEDs are provided through a lensing system to feed the transmit fibers 18. This provides a great deal of convenience because, due to the multiple frequencies of the LEDs, different types of computed radiography plates can be used in a single scanner.

Furthermore, emission can take place in both the infrared and the visible red band simultaneously so that any type of computed radiography plate can be read. Through the use of the transmit fiber optics, the light can be focused precisely on the computed radiography plate 12 to reduce the pixel size to about 44 microns.

Furthermore, the transmitting fibers are energized in multiple units; however, only every sixty-third or sixty-fourth fiber in the transmit fiber array 18 is energized at a time to provide a wide distance between simultaneously energized fibers. This avoids crosstalk between energized spots on the computed radiography plate 12. The multiple energization through the transmit optical fibers 18, however, provides very rapid response back through the receive fibers 20 while avoiding crosstalk and smearing of the image at the computed radiography plate 12. The received light, coming into the 500 micron receive optical fibers 20, is then received by separate photodetectors 68 which generate a received light signal. The received light signal is then amplified in the operational amplifier circuit. The operational amplifier provides a low-noise signal to an analog to digital converter which, in the present embodiment, has sixteen bits of resolution and provides a sixteen-bit intensity signal for further processing for displaying an image or the like.

In order to provide the highly-accurate spot sizes, the receive fiber 20 ends are polished flat in order to allow them to be seated against the transmit fibers 18 without distorting the transmit fiber array 18 line into a catenary or sine-wave line, which would lead to distortion in the excitation areas on the computed radiography plate 12. Further, the transmit fibers 18 are held in alignment by the transmit support bar 64 (FIG. 2) to which they are attached even though they are brought into intimate contact or very close to the receive fibers 20. Likewise, the receive fibers 20 are rigidly held by the receive fiber support bar 66 and then both the receive fibers 20 and the transmit fibers 18 are covered with a potting compound or a suitable opaque compound 70, which prevents light from entering the fibers 18 and 20 through their sides, thereby reducing crosstalk, and holds them rigidly over a wide range of temperatures. The fiber ends and the plate 12 are spaced and held at a closely spaced, substantial constant gap of about 0.001 to 0.003 inch from each other. The light from the transmit fibers has a core angle of about 22° from the end of the fiber to the underlying plate in the preferred embodiments of the invention. The fiber ends could be supported by an air bearing at about 0.0015 to 0.0020 inches above the computed radiography plate 12 being scanned. By closely positioning the fiber ends and maintaining a substantially constant gap between the fiber ends and the plate 12, there is achieved a high resolution scanning by reducing or eliminating the spot overlap at the computed radiography plate 12.

Furthermore, through the use of the multiple LEDs 34, 36, and 38 and the multiple transmit fibers 18, the blue LED 38 can be used to monitor, using non-phosphorescent-generating or normalizing light, in order to determine if an LED has gone out. This would be indicated by the normalization data going out of range rapidly.

Furthermore, the use of the multiple transmit fiber elements 18 enables the adjacent small micron pixel regions on the computed radiography plate 12 to be energized individually and allows determination of the degree of blooming or smearing noise or residuals.

As may best be seen FIG. 7, in an alternative embodiment of the present invention apparatus or a computed radiography scanner 99 having a plurality of excitation or transmit optical fibers, as exemplified by a pumping or excitation fiber 100 having a core diameter of about 44 microns, supplies a pumping light to a substrate 102, which may be a computed radiography plate or sheet, in a light cone 105. Phosphorescent emissions 106 may be received back by a first receive fiber 110 and a second receive fiber 112 on opposite sides of the excitation fiber 100. In order to capture more of the emitted phosphorescent light from the computed radiography plate 102 the receive optical fibers 110 and 112 may be combined at a receive fiber junction 114 to supply a larger optical output for ultimate detection by an optical receiver 116.

Referring now to FIG. 8, another alternative embodiment of the present invention is shown therein and generally identified by reference numeral 210. It comprises a computed radiography scanner for use in scanning an exposed computed radiography substrate 212, which may be a computed radiography plate or a computed radiography sheet. Such a computed radiography plate or sheet 212 is normally held in a light-tight cassette but is removable for reading or scanning.

The computed radiography scanner 210 comprises a light-tight enclosure 214 for holding the computed radiography plate 212 during scanning. An optical pump source 216 produces pumping light to be delivered to the plate 212 in order to generate phosphorescence in response to a latent X-ray image formed therein. The pumping light is carried from the optical pump source 216 through a plurality of transmit optical fibers 218 to the vicinity of the substrate 212. A second plurality of optical fibers 220, more specifically a plurality of optical receive fibers, receives localized light produced by phosphorescence stimulated by the optical pumping light and delivers that phosphorescent light to an optical receiver 222. The optical receiver 222 converts the received phosphorescent light from the receive optical fibers 220 to an electrical signal which is supplied to a processor 224. In conjunction with a memory 226, the processor 224 generates a display signal representative of the latent image from the computed radiography sheet 212.

A housing 300 (FIG. 9) holds and defines the light-tight enclosure 214. Within the housing is the processor 224, which is, more specifically, a microprocessor or a microcomputer, but may also be embodied in a custom integrated circuit or the like. The memory 226 is connected to the processor 224 and may be used to store instructions and/or data. A display 230 is connected to the processor 224 to receive the display signal therefrom and in order to provide a visual reconstructed image of the phosphorescent image, which itself is representative of the latent X-ray image. More specifically, the display 230 displays a visible image counterpart to the latent image formed on the computed radiography plate 212 by the X-ray exposure. The processor 224 controls the optical pump source 216 via a power supply 232. The power supply 232 energizes a helium-neon laser 234 carried on a circular platform 236. The circular platform 236 is rotatable about a shaft 238 by a DC servo motor 240 under the control of the processor 224.

The optical receive fibers 220 are substantially identical to the optical receive fibers 20. With the exception that the optical fibers 218, receive, at a plurality of circularly-arranged input fiber ends 242, laser light from the laser 234 which is scanned by the rotating turntable 236 to inject the laser pumping light directly and serially into each of the transmit fibers 218. This causes a pumping light raster scan to take place across the transmit fiber array 218 at the computed radiography plate 212. The raster scan through the small diameter transmit fibers 218 ensures that high resolution optical excitation is provided to the computed radiography plate 212, thereby providing a high resolution phosphorescent signal to the receive fiber array 220. This ultimately enables the creation of a high resolution image by the display 230.

In order to provide further gain in the computed radiography scanner 210, the optical receiver 222 comprises a photomultiplier tube 246, which is connected to an amplifier 248. The photomultiplier tube 246 provides an image signal which is amplified by an amplifier 248 to provide another image signal comprising an analog amplified image signal. The amplifier 248 is connected to an analog to digital converter 250 which converts the analog amplified image signal to still another image signal comprising a digital image signal and sends the digital image signal on an image signal bus 252 to the processor 224 for display of the visible image on the display 230.

The computed radiography plate 212 is moved with respect to the transverse raster scanning direction by a stepper motor 254 under the control of the processor 224, to which it is connected. The position of the computed radiography plate 212 is sensed and a plate location signal is sent to the processor 224 over a line 256. This allows the processor 224 to create a high resolution digital image from the phosphorescent light being returned from the computed radiography plate 212.

Figure 9:
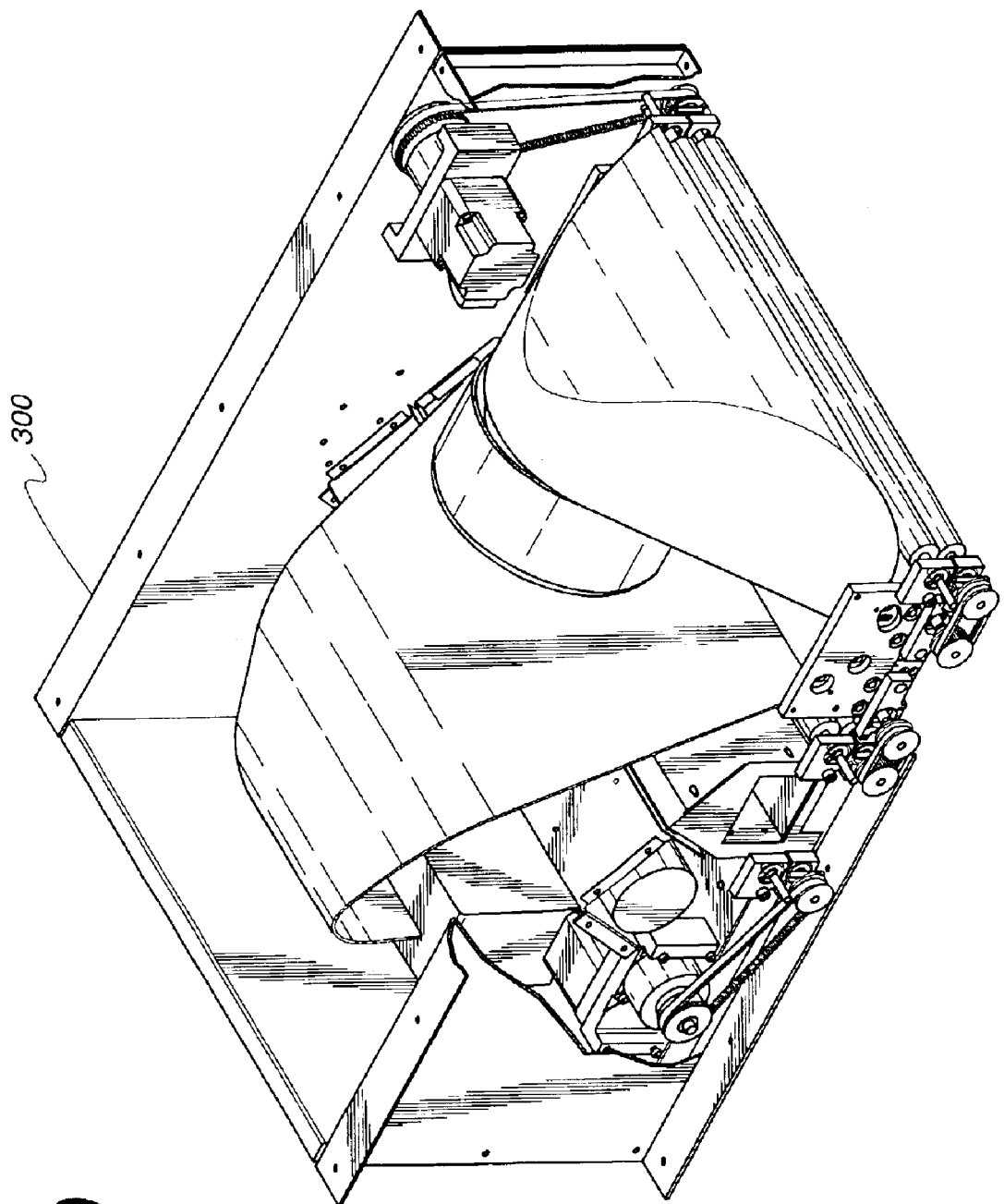
FIG. 9 is a perspective view of still another alternative embodiment of the present invention.

An apparatus 300, as shown in FIGS. 9 and 10, comprises still further embodiment of the present invention includes a light transmitting unit 302 and a light receiving unit 304. The light transmitting unit 302 has an optical fiber section 306 with a drive and laser illuminator section 308 associated therewith. As may best be seen in FIG. 11, an electric motor 310 has its drive shaft connected to a circular carrier plate 312 having a laser 314 positioned thereon for emitting or launching laser pumping light into a plurality of transmit optical fibers 318. The transmit optical fibers 318 comprise fibers of about 65–67 O.D. with a 44 micron core, in this instance, and are formed originally on a cylindrical drum 320, a portion of which is cut off and present in the system.

The optical fibers 318 are wound from a single fiber around the drum 320 and approximately 8,000 fibers are provided thereon. The drum 320 is then covered with a outer wall layer of sold material 322 such as of a potting compound material that holds the fibers against a shifting or vibrating. The outer wall and fibers are then cut along a cut line 324 in the manufacture of the O-rim 320 with the fiber 318 thereon. The optical fibers 318 exit the bottom of the drum in a substantially linear array as shown in FIGS. 11 and 12.

Figure 14:
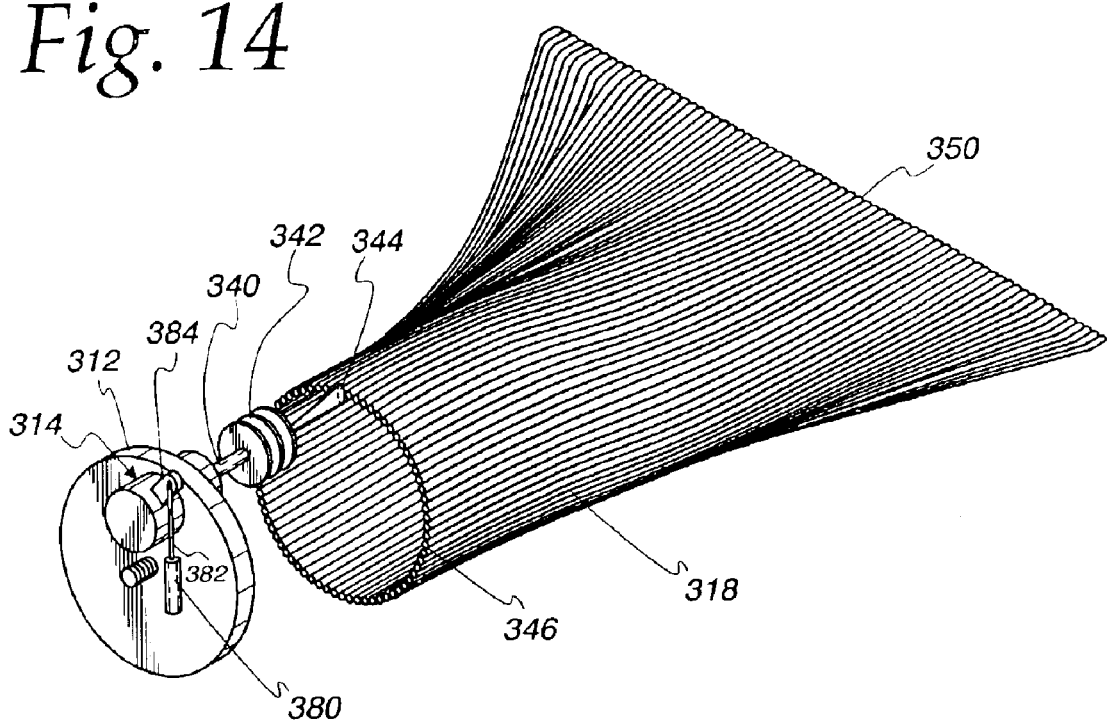
FIG. 14 is a perspective schematic view of a portion of the apparatus shown in FIG. 9 including details of a laser, a rotatable carrier carrying the laser, a lens train, and the transmit optical fibers.

The fibers 318 are positioned closely with a computed radiography plate 326 which may enter an inlet 328 of the system 300, pass over a pair of guide rollers 330 and 332 which are powered to drive the plate 326 toward the region where the optical fibers 318 terminate in a linear array. At that region light from the laser 314 is carried sequentially down the optical fibers 318 as the laser 314 is rotated with respect to the optical fibers 318 and, as may best be seen in the schematic view shown in FIG. 14, allows a light beam 340 to pass through an optical train 342 consisting of a double convex lens and a meniscus or concave-convex lens. The focused pumping light is forms a substantially elliptical footprint 344 at a plurality of ends 346 of the optical fibers 318. The ends 346 are arranged substantially in a circle and receive the laser light. The pumping light then exits the optical fibers 318 at a plurality of output ends 350 where it is delivered to the computed radiography plate 326 for scanning. X-ray energy previously stored in the CR plate 326 is released as emitted light having been stimulated by the pumping light. The emitted light enters a one-piece light pipe 352 which comprises a portion of the light receiver 304. The one-piece light pipe 352 comprises a transparent plastic body which sends light to an optical receiver section 360. The preferred light pipe 352 has the same construction as the light pipe 650, which is described hereinafter in greater detail with respect to the illustration in FIGS. 20–25. The optical receiver section 360, as will be seen further, includes a photomultiplier 362 for receiving light emitted from the computed radiography plate 326 and developing an electrical signal therefrom.

The computed radiography plate 326 then is carried to the right between another pair of rollers 370 and 372 driven by a stepper motor and may be carried into a plate storage section 374. In other embodiments, the plate storage section 374 may be open to allow the plate to extend out the back. A continuous loop-type plate may be used in that modified scanner so that a single loop of computed radiography plate or sheet material may continuously pass through the scanner to provide continuous scanned images, for instance, in an industrial X-ray system which needs to monitor operations dynamically.

After having been scanned the CR plate 326 is carried by the rollers through a exit region from an exposure area, an eraser head 380 comprising a plurality of eraser lamps 382 illuminates the plate 326. This causes the excess or residual X-ray energy that has been stored in the plate 326 to be released as blue light thereby erasing the plate. The plate 326 will then be reversed and sent back, in FIG. 11 to the left out of the storage area, past the eraser head 380 again and the exposure are including the optical fiber 318 and the light pipe 352 and the apparatus 300 will be ready to receive an additional plate for further scanning.

Figure 15:
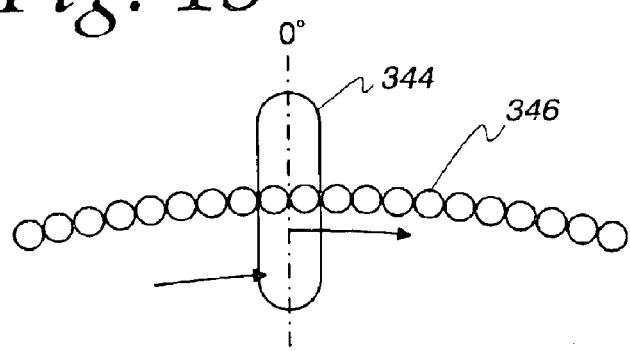
FIG. 15 is a representation of single fiber excitation in a high resolution mode.

The CR plate 326 may be scanned either at low speed and high resolution or high speed and low resolution. In the low speed, high resolution mode, the elliptical illumination spot on the fiber ends 346 is oriented as shown in FIG. 15 where only one or two fibers are illuminated at a time as the pumping beam is swept past. It may be appreciated that a major axis of the illumination ellipse extends substantially along a radius of rotation of the carrier plate 312. The laser 314, however, can be rotated with respect to the carrier plate 312 by an actuator 380 connected via an arm 382 to a moment arm 384 connected to the laser 314 to cause the laser to rotate 90° about its illumination ellipse 344 so that the major axis is substantially parallel to a tangent plane to the fiber ends 346.

In this way up to ten optical fibers can be illuminated and a rapid scan can be made of the CR plate 326 albeit at lower resolution. Such rapid scans are particularly useful for processing scout shots where an initial determination is being made as to whether a lesion is in fact present or not.

The apparatus 300 is controlled by a personal computer, which maybe a laptop, 400 as shown in FIG. 13. Power for the apparatus 300 is received from an AC line voltage source on a line 402. The power which is supplied to a filter 404 and DC power is developed by a pair of DC power sources 406 and 408 for use in other portions of the apparatus 300. The computer 400 is also connected to a display or a monitor 410 for displaying video images. The computer 400 has a separate power source 414. The computer 400 communicates with the portions of the apparatus 300 via an RS-232 or RS-495 port 416, which is connected to a communications port 418 for communication therewith. That communication port 418 conveys digital signals through an isolation section 420 to a microcontroller 422 which is mounted on the rotatable carrier plate 312 and is used to control the laser 314 and also to detect laser temperature functions via a module 424. Feed signals are supplied to the microcontroller 422 via a connection through a slip ring section 430 and the microcontroller 422 and the laser 314 are rotated by the motor 308 controlled by a motor controlled driver 440.

The photomultiplier 362 has its output filtered by a filter 450 and a signal is ultimately supplied through an interface board to the computer 400 over a bus 452. The apparatus 300 also allows control from the computer 400 of a pair of clutches 470 and 472 for control of the rollers through a high speed clutch control 474 coupled via an interface card 476 to the processor. A stepper motor 490 controlled through a motor control circuit 492, coupled through the interface cards to the computer 400, controls scanning, storage and retrieval movement of the computed radiography sheet 326 through the apparatus 300.

The interface card 476 is also connected via a control bus 500 to the eraser lamps 382 of the eraser 380. A plurality of thermistors 502, 504 and 506 supplies signals back through the interface card to the computer 400 to warn of over temperature conditions. In the event of such over temperature the computer 400 will cause the eraser lamps 382 to be shut down to avoid damage to the apparatus 300 or the computed radiography sheet 326. The eraser lamps 382 are controlled through relay circuits 510 connected through the interface board 476.

Figure 17:
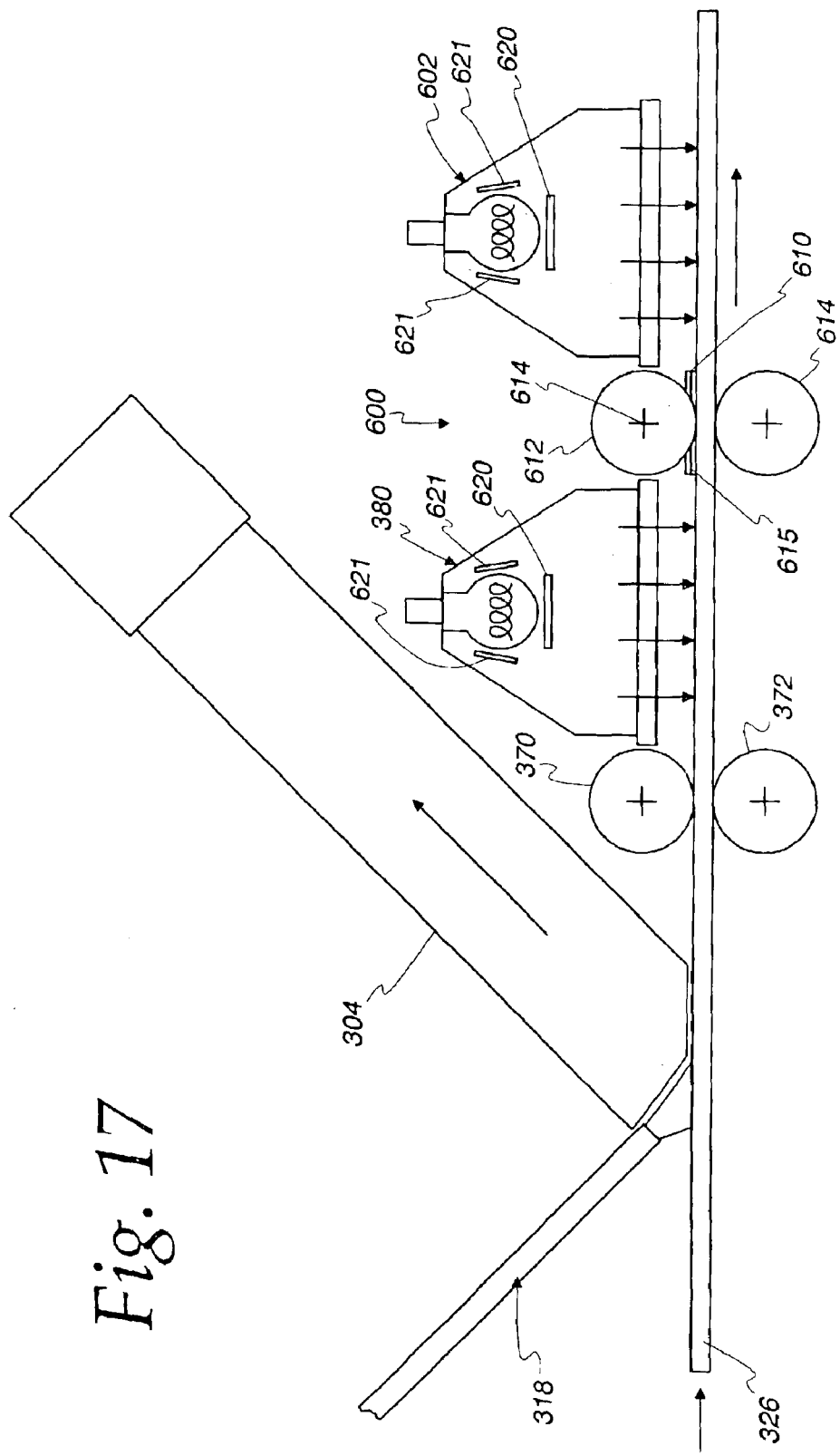
FIG. 17 is a diagrammatic view of another embodiment of the invention having separated erasing devices.
Figure 18:
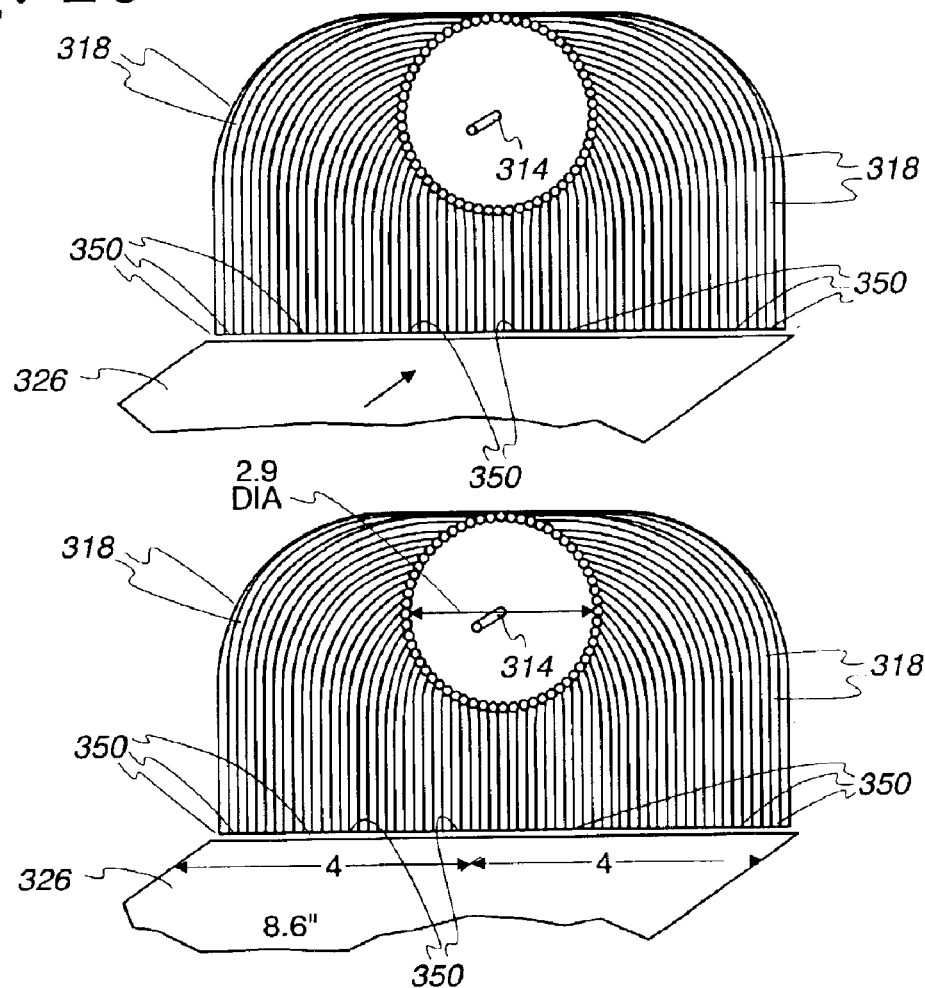
FIG. 18 is a view showing diagrammatically a modular construction for the transmit optical fibers for plates of different sizes.

In accordance with a further aspect of the invention, the erasing of the residual latent image is providing multiple erasing operations separated to provide a relaxation period of time between successive exposures to the erasing light. The energy stored in the plate 326 is erased or removed by about two-thirds by the optical pumping light and the subsequent phosphoresce. This leaves about one-third of the latent energy still present as a residual image on the plate prior to erasing. In the prior art, the erasing of these plates has heretofore been done or separate machine. One problem with erasing is that some objects create latent areas or lines that are difficult to erase and often leave ghosts on the plate when trying to be erased in prior art methods of erasure. Successive erasings remove the latent energy from the residual image and appear to follow a hyperbolic like curve where it is difficult to erase all of the latent image. It has been found that a brief relaxation, e.g., three to ten second, between successive erasures is effective in obtaining superior erasing of the faint ghosts that would otherwise be present if no relaxation period is used. Thus, for example, as shown in FIG. 17, a first erasing station 380 is separated by a gap or space 600 from a second erasing station 602. A light seal 610 in the form of a roller 612 rotates about a horizontal axis 614 and is mounted in this instance, also to hold the plate 326 down against an underlying roller 614. A first light seal in the form of an upper rotating roller 370 seals against the pumping light and emitted light from entering the first erasing device 380. The first light sealing roller 370 also holds the plate 326 tightly against the underlying roller 372 to assist in precisely positioning the plate at the desired tolerance or gap, e.g., 0.003–0.004 inch gap between the plate 326 and the adjacent ends of the light emitting fibers 318 and the light pipe 304.

In the embodiment of FIG. 17, the portion of the plate 326 erased in the first erasing device 380 travels in darkness for about a 3 to 10 second interval for relaxation at the molecular level, under a horizontally, ending cover plate 615 that extends between the first erasure device and the second erasure device and is parallel to and spaced slightly above the top surface of the plate. The molecular energy relaxes while the plate portion is in the dark while under the dark cover plate 615.

Although the erasing devices may vary in design, an inexpensive erasing device 380 or 602 for use in the machine described herein is formed of about eight or nine projection bulbs 382, e.g., one inch bulbs of white light, a filter 620 and a reflector 621 (FIG. 17). Herein, the preferred filter 620 provides orange light to the plate that is effective in erasing plates, particularly those containing barium. Other plates having other rather earth elements may be erased with white light.

Preferably, the bulbs may be spaced about one inch from the plate 326. The reflectors 621 about the bulb provide a very even and intense light across the plate. For the other plates, where a white light is used, the filters are not needed. While two erasing stations have been illustrated, a third station, a fourth, etc. stations may be provided with a relaxation period between each of the erasing stations.

Figure 19:
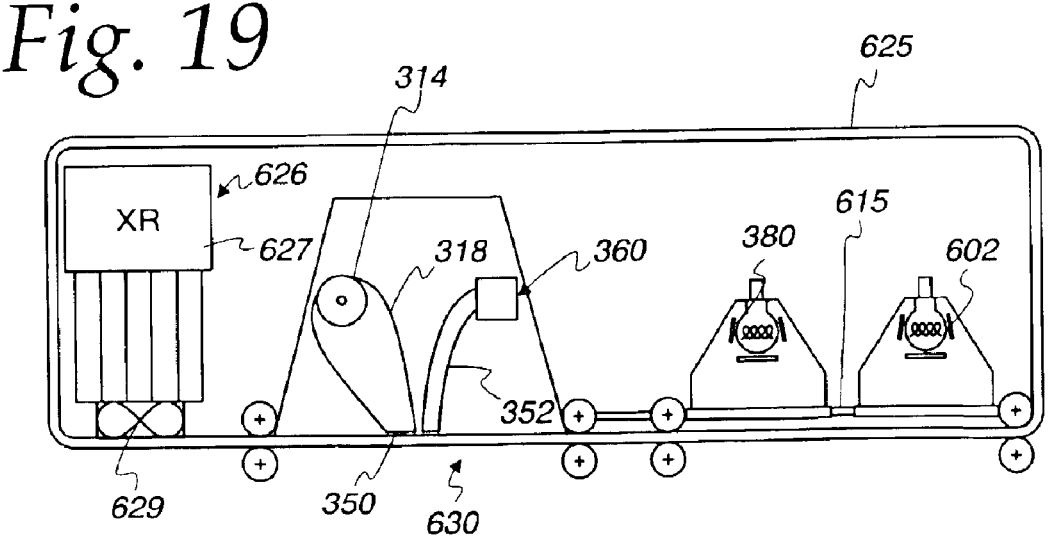
FIG. 19 is a diagrammatic view of an endless belt system embodying the invention therein.

In accordance with a further aspect of the invention diagrammatically illustrated in FIG. 19, the radiographic plate 326 could be an endless belt or a sheet on an endless belt 625 that leaves the erasing heads 380 and 602 and travels to an x-ray station 626 having an x-ray head 627 which x-rays the part, e.g., a turbine blade 629 or the like with the latent x-ray image then traveling in a loop and entering the scanning station 630 and traveling past the scanning transmit fibers 318 and receive pumping light emanating from the rotating laser 31. A light pipe 352 (preferably constructed as described for the light pipe 650) delivers emitted light to the optical receiver section 360. After scanning the impeller blade object, the endless radiographic belt can then travel past the multiple erasing devices 380 and 602 separated by the cover plate 615 with a relaxation period therebetween to erase the last residual, usually about one-third of the x-ray image energy. The now erased portion should be free of ghosts or residual image and can travel about the endless path back to the x-ray station 626 for the x-raying operation to apply a new x-ray latent image on the just erased plate 326 on the endless radiographic belt.

In accordance with a further aspect of the invention, the size of the apparatus described herein may be quite small and light weight compared to some of the conventional apparatus. The illustrated circular-arrayed, ends of the transmit fibers 318 is, by way of example, only 2.9 inches in diameter and the opposite ends 350 of the fibers 318 extend linearly for only about 8.6 inches for the typical plate 326. The device may be made modular in that if only one-half of head has a semi-circular array of fibers 318 than the transmit fiber ends 350 will extend linearly about 4.3 inches in length. For an 8.6 inch width of scanning on the plate 326, a full circle array of transmit fibers are provided on the 2.9 inch diameter drum and the transmit fiber ends extend linearly for 8.6 inches. Two substantially transmit fiber drums may be placed axially end to end to provide a linear extent of about 16.4 inches of transmit fiber ends 350 extending across a wide sixteen inch plate. Thus, the same shaft with two laser heads 314 may be used with two 2.9 inch diameter heads disposed axially side-by-side for scanning 16.4 inch wide plate 326.

By way of example only and not by way of limitation, the apparatus shown in FIGS. 7–18 has a measurement of about 13 inches in length, 13 inches wide and 14 inches in height in contrast to the conventional machines which often are several times larger in volume. This smaller more rugged apparatus will typically weigh about 180 pounds or less compared to some conventional units that may weight about 700 pounds. Obviously, the smaller more rugged device of the present may be more readily carried by troops into combat or by other persons packing equipment into remote rugged areas in the field. The ability to erase latent images from the plates in the machine also means that fewer plates have to be transported into combat or the field than with present machines lacking an erasing operation or feature.

By way of example only and not by way of limitation, this small size imaging and scanning device of the preferred and illustrated embodiment of the invention uses a 1000 milliwatt laser that is energized to about 200 or 250 milliwatts in use. The laser light used for these barium containing radiographic plates is in the range of about 1020 to 1025 nanometers, that is in the U.V. range. For other plates, the laser light used for the phosphorescing is in the range of about 670 nanometers. Also, by way of example only and not by way of limitation, it is preferred to rotate the laser head at about 6600 rpm and to synchronously feed forward the plate so that it is scanned in about 60 seconds. The respective scanning head motor and the linear drive for feeding the plate 326 are synchronous drives so that the rotation speed and the plate travel speed are kept at a constant value relative to another throughout the scanning of the plate. Thus, it will be seen that the only effective moving parts involved in the light train to and from the plates are the laser turned by its motor and the plate 326 moved forwardly rectilinearly by its motor. Thus, vibrations that effect mirrors in the light train or cause misalignment problems in the prior art machines are avoided with this invention.

In the preferred embodiment of the invention, an optical glass fiber of the desired diameter, for example, 0.065 to 0.067 inch diameter, is wound with adjacent windings touching but not overlapping on a cylindrical drum. After the fiber winding, the fiber is then potted or bonded on the drum so that it will not shift and so that it will retain its precise side-by-side position. The drum wall is then cut longitudinally to form first and second ends for the slit, that is cut drum. Each fiber winding on the drum now has two cut ends disposed opposite one another on the respective opposite cut ends at the slit made in the drum. One cut end of the drum is rearranged into a circle to arrange the cut fiber ends thereon in the circular array. The other opposite cut end of the drum is spread linearly and the opposite end 350 of each fiber is thus also in a linear array. Thus, each fiber winding has a first end in a circular array to receive the pumping light and each fiber has an opposite end 350 in a linear array to deliver light to the radiographic medium. Herein, the first and second cut ends of the fibers are polished to either receive and deliver light. In the example given herein, the linear extent of the cut fiber end is about 8.1 inches and the diameter of the arcuate end is about 2.9 inches.

Figure 21:
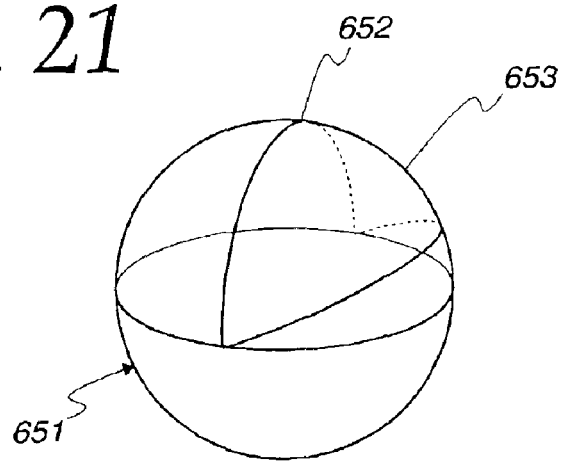
FIG. 21 is a diagrammatic view of a phosphorescent spot on the imaging plate.
Figure 22:
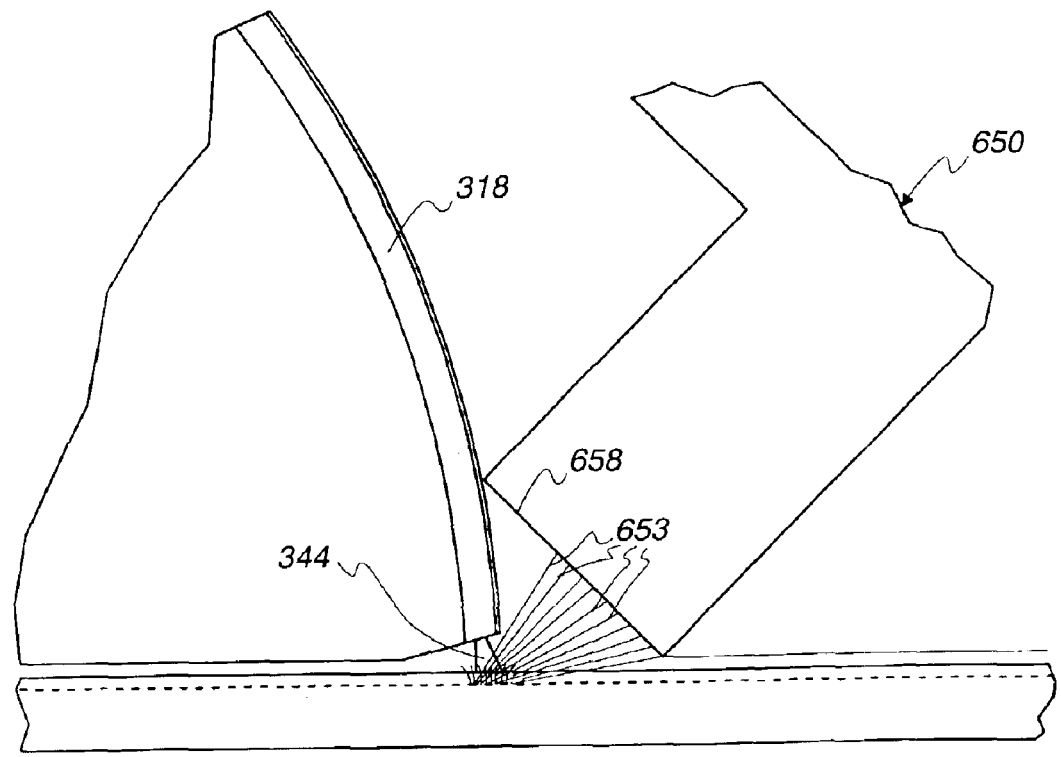
FIG. 22 is a view of a transmitting optical fiber end with laser light applied to the surface of an imaging plate and a closely positioned end of an emitted, light collector for delivering light to a receiver.

In these radiographic imaging systems using a imaged plate, the light collecting from the phosphorescence of a spot and deliverance to a photomultiplier receiver has been a significant problem which has been addressed by many different solutions over the years. The problem is that there is a very faint light that is phosphorescing and this must be converted into an electrical reading signal with high efficiency and low noise. This is required because there is an absolute need for a high quality image from the x-ray latent image upon the plate. The phosphorescing light will be a relatively small area in that the light hitting the plate in this instance is moving down a small diameter fiber as shown in FIG. 22 of only about 0.002 inch in diameter located closely adjacent to surface 649 of the plate 326 as shown in FIG. 22 such that the light goes beneath the surface and causes an phosphorescence which can be akin to an explosion of phosphorescent light of generally hemispherical shape 651 as shown in FIG. 21. Only one quadrant, for example, the right hand quadrant 652 of the hemispherical phosphorescence emits photons which travel along various straight line paths 653 from the quadrant 652 into the light collecting guide or light pipe 650 shown in FIG. 22. The light is so faint that in a very dark room only a faint glow may be seen and the amount of light is really measured in protons since the light is so faint. Space is another problem in that there are 8,000 transmitting fiber ends over four inches and each fiber is only about 0.002 inches in diameter. The collecting of light from the closely spaced spots of fluorescent light from the plate is a difficult manufacturing problem, if receiving fibers 20 such as described in an early embodiment of the invention are used.

Figure 20:
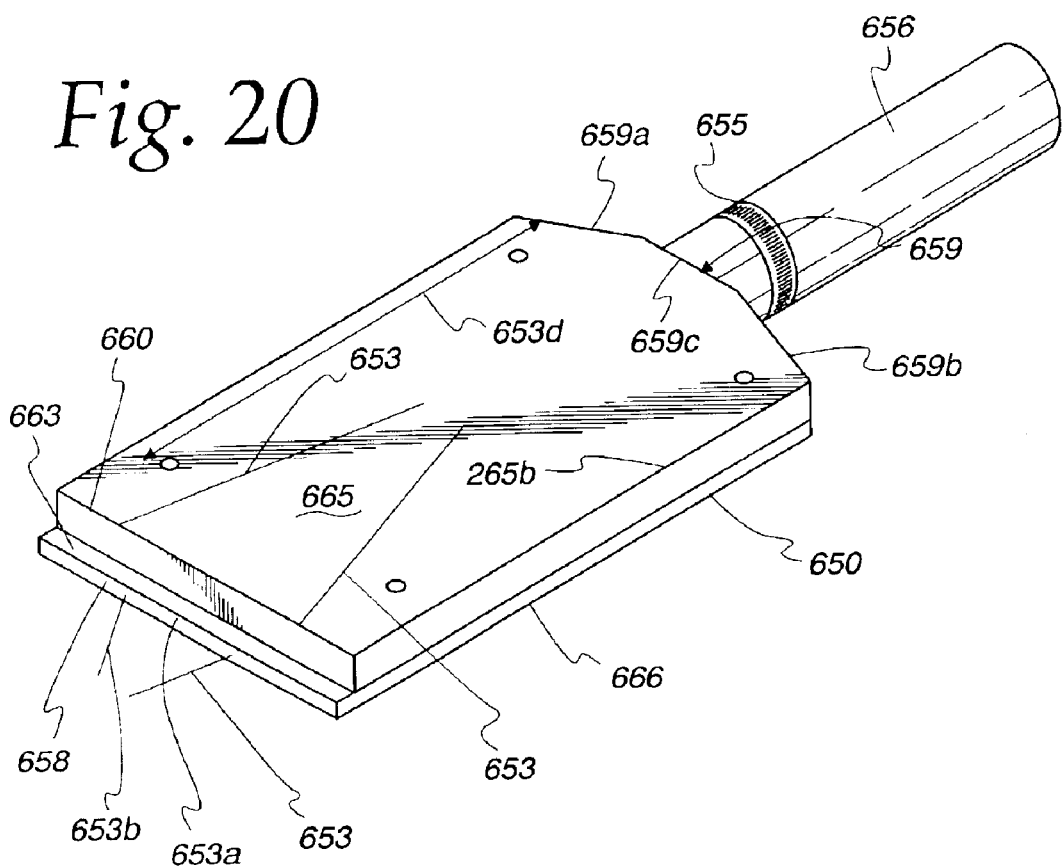
FIG. 20 is a perspective view of a light guide constructed in accordance with an embodiment for delivering emitted light to a photomultiplier tube.
Figure 20A:
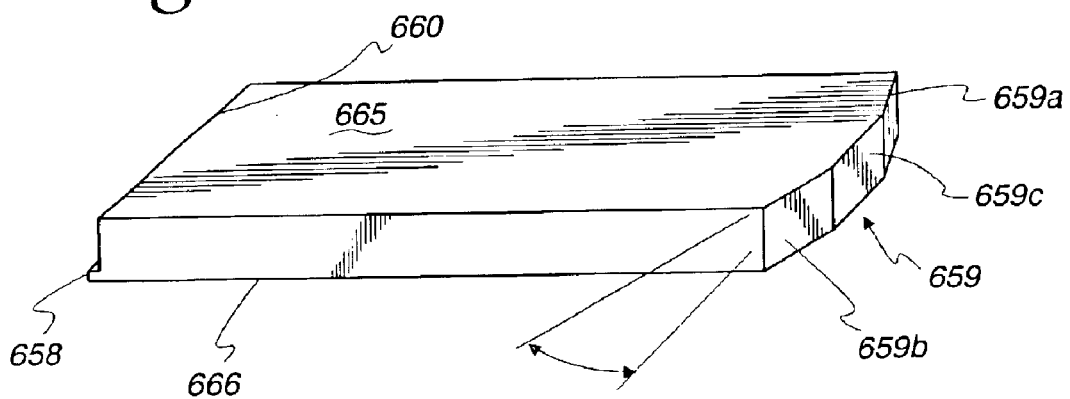
FIG. 20A is a side perspective view of the light guide of FIG. 20.

A further complicating factor is that the typical photomultiplier tube which is used as the light collector is usually circular in diameter and has a relatively small diameter, typically about 1.1 inches in the herein described embodiment. The 1.1 inch width is about one fourth of the total 4.3 inch width for the extent of the linear array of transmitting fibers 318. That is only about one fourth of the photomultiplier tube will be positioned to receive incoming photons traveling upon along a line of travel paths 653 aligned to travel straight through the light guide 650 to hit face 655 of the photomultiplier tube, as shown in FIG. 20. Other photons will be traveling along incoming light travel paths 653a in FIG. 20 to the left of the face 655 and other photons will be traveling along the light path 653b to the right of the face 655. When the light guide 650 extends laterally across the entire linear array of the transmitting fiber ends, the guide will have a width of about 4.3 inches such that with a centered photomultiplier tube having a diameter of 1.1 inch, there is about 1.6 inches on each side of a photomultiplier tube. Stated differently, only about one fourth of the area of the photomultiplier tube is aligned directly across the 4.3 inches to receive those photons traveling along paths like 653 directly to impact the surface 655. It can be seen that with only the collecting of photons from one quadrant of the hemispherical phosphorescence 651, as shown in FIG. 21 and only one fourth of the area of the photomultiplier tube face 655 is aligned to directly receive incoming photons traveling along the line 653. A particular problem is collecting and delivering emitted photons from each of the 8,000 fiber ends extending along the 4.3 inch extent of the linear array of fiber ends and phosphorescent explosions. The light guide cannot simply be tapered to the 1.1 inch diameter at the rear end because the incoming photons striking the side walls of the light guide will be reflected rearwardly or diffused such that they will not reach the surface 655 of the photomultiplier tube 656.

In accordance with the embodiment of FIG. 20, the light collecting guide 650 is provided with the narrow area entry 658 which extends for a significant length, for example, the entire 4.3 inch linear extent of the fiber ends to allow the entry of photons into the light pipe 650. The photons traveling along paths similar to 653 through the entry end will travel through the acrylic resin block of the light pipe 650 to a rear end central portion 659 which is aligned directly with the photomultiplier tube face 655 to hit the face and generate an electrical signal as they impact or hit the face 655 of the photomultiplier tube. However, the photons traveling along other, non-aligned light paths, e.g., light paths 653a and 653b to the left of the light of the face of the photomultiplier tube will impact or hit rear light guide surface 659a to the left or light guide surface 659b to the right of the central surface 659.

In accordance with the illustrated embodiment, these surfaces 659a and 659b are mirrored or reflective surfaces that reflect the incoming photons back towards the front end 660 of the photomultiplier tube.

Rearwardly reflected protons will travel along rearward paths back towards the front end 660 where they will encounter a front reflective surface such as a mirrored surface 661, which is a forward reflective surface, at which the photons will again be reflected forwardly to travel forwardly along a path to the rear surface 659 of the light collecting tube 650. Preferably, if one or more of the mirrored reflective surfaces 659a, 659b and 661 are angled such that the photons do not travel simply backwards and forwards along the same path.

Those photons traveling rearwardly, after have been reflected from a reflective surface 659a or 659b, will for the most part hit the forward reflective surface 660 since it covers a much larger area than the area of the entry 658. For instance it is preferred that the entrance of the relatively thin, narrow entry having a height, for example, of 0.01 to 0.0626 inches with the illustrated height being about 0.40 inches and the upper, forward reflective surface 661 is a multiple of ths height. For example, the entire front end of the light guide may be from about one half inch to one inch thickness for the light pipe.

In this illustrated embodiment of the invention, the height of the entire block is about 0.625 inch. If one subtracts the 0.40 inch inlet 658 that leaves a forwardly reflective surface to be about 0.585 inch in height. From an area standpoint, the entry 658 is about 6.6 percent of the area. Thus, of the photons reflected rearwardly, only about 6.6 percent of the photons should leave the entry slit 658 with about 93.4 percent of the photons being reflected back from the front reflective surface to travel forwardly again, by way of example only. It is estimated that with about five or six bounces that there should be a capture of about 70 to 80 percent of the photons entering the light guide.

In the illustrated embodiment shown in FIG. 20, the rear reflective surfaces 659a and 659b are at a slight angle relative to the central surface 659c which is parallel to the face 655 of the photomultiplier tube 656. This inclination angle is preferably in the range of about 6 to 9 degrees. As stated earlier the light hitting the inclined surfaces will be randomized by moving along a different rearward path than its preceding forward path because of the inclination of the surfaces of 659a and 659b. The forward mirrored surface 661 is straight in this instance.

Figure 23:
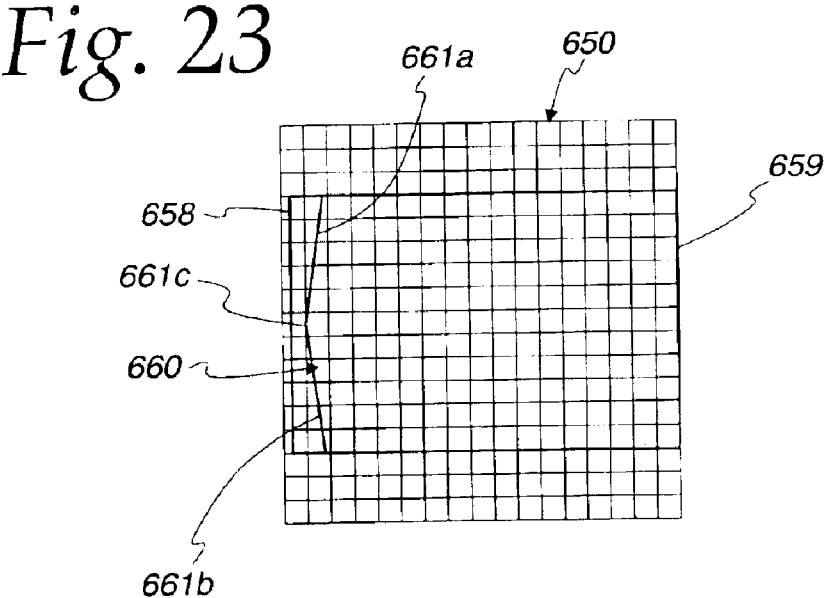
FIG. 23 is an illustration of another embodiment of the light guide with inclined reflective surfaces at a forward end of the light guide.

In another embodiment shown in FIG. 23, the rear wall 659 of the light tube 650 is straight across the entire rear 659 of the light tube without and inclined positions. That is, the face 655 of the photomultiplier tube is in a plane parallel to the plane of the rear wall 659. Instead, it is the front end 660 that is provided with two inclined deflection surfaces 661a and 661b which perform the reflecting of the photons along more random paths to prevent them from being trapped by merely going back and forth along the same path between the rear deflective surface 659 and the front reflective surface 660. The forward reflective surface 661 is preferably formed of the two reflective surface positions 661a and 661b which meet at a center intersection 661c midway between the opposite sides of the light guide. In the embodiment of FIG. 23, there is also a small light entry 658 that is in the shape of a ledge located below the mirrored, reflective forward reflective surface 661.

The locating size and shape of the reflective surfaces may be varied from that illustrated herein and there may be inclined reflective surfaces at both the forward and rearward portions of the light guide.

Figure 24:
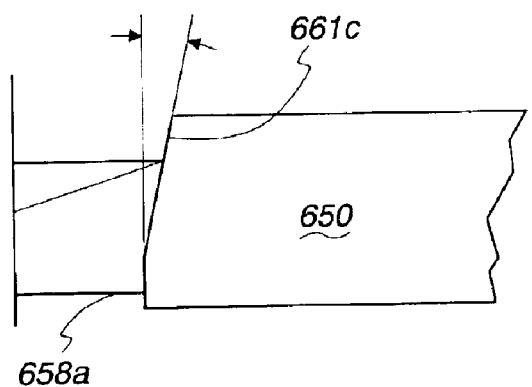
FIG. 24 is a fragmentary view of a forward inlet end of a light guide constructed in accordance with a further embodiment.
Figure 25:
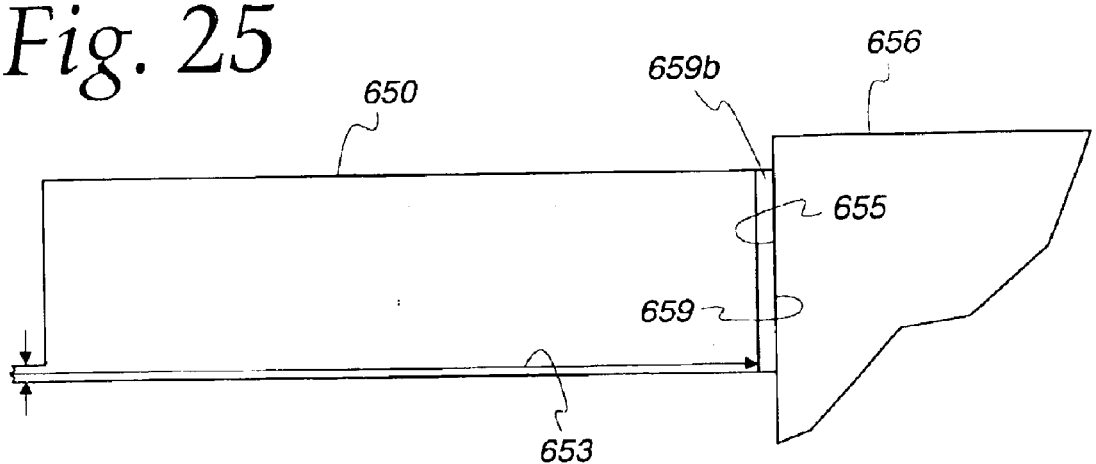
FIG. 25 is an enlarged side elevational view of the light guide and photomultiplier tube.
Figure 26:
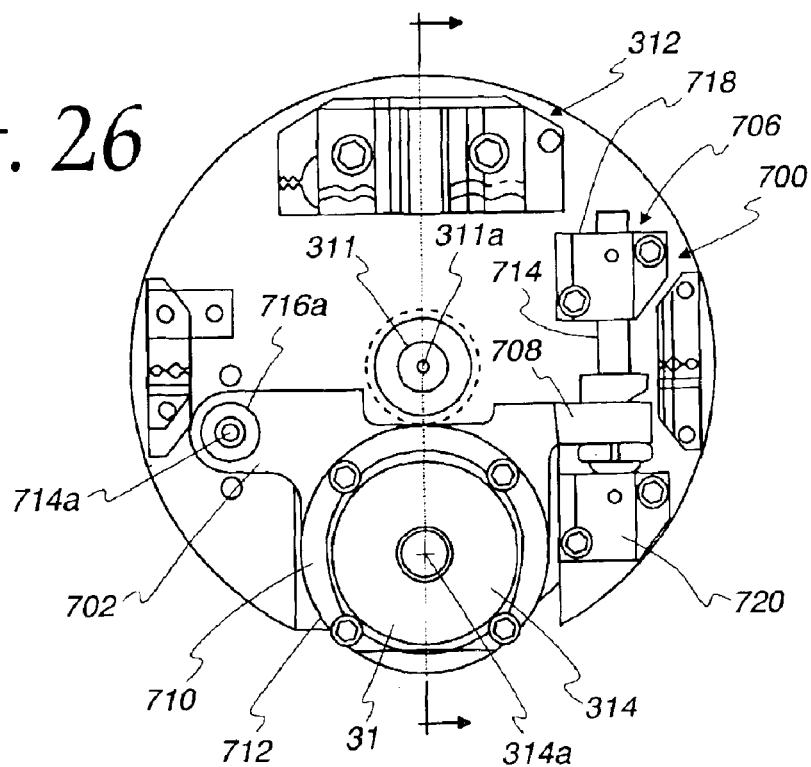
FIG. 26 is a view of the rotating carrier plate and adjustment mechanism for focusing by shifting the laser in an axial direction and in a radial direction.

In the embodiment of FIG. 20, the inlet 658 is a narrow shoulder or ledge which has a upper flat shoulder wall 663 extending horizontally parallel to a top wall 665 for the light tube which is parallel to the bottom horizontal wall 666 as shown in these figures. This allows the inlet edge to be positioned more closely adjacent to the fiber ends as shown in FIG. 22. Rather than having the projecting ledge, another embodiment for the inlet may have a downwardly inclined rear reflective surface 661f, as shown in FIG. 24. The tapered reflective surfaces 661f allows the inlet 658a to be positioned again close to the transmit fiber ends and close to the phosphorescing spots 651 emitting the photons which are being collected through the entry 658a, as shown in FIG. 24.

It is estimated that about 25 percent of the photons incoming through the entry 658 will hit the photomultiplier face 655 without being reflected and that approximately 75 percent of the photons will be reflected to travel rearwardly to the forward reflective surface 660 with about a 6.6 percent loss due to those photons which will leave the light guide 650 through the entry 658. Thus, it is estimated in this illustrated embodiment, that about 6.6 percent of the rearwardly traveling photons will exit the front entry and be lost for each rearward reflection. It is estimated that of the total photons entering the light guide that about 70 to 80 percent of the photons will be captured. It is through that some of the photons may be reflected back and forth as many as six times.

The reflective surfaces are preferably mirrored surfaces which are formed by a sputtering of gold or silver to form a thin coating of only a few angstroms in thickness. Silver nitrate may also be used. If the mirrored surfaces are not thin coated surfaces but are of a thicker layer as in a common mirror, there will be an index of diffraction which causes a loss, and too much diffusion being presented. More specifically, if the mirrored coating to form the reflective surface is thick there will be an interface between the thick coating and the acrylic resin wall of the light guide that will cause the loss of photons. Manifestly, the method of making the mirrored surfaces may be varied from that described herein, as by way of example only.

There are a number of problems which have to be solved when using a rotating laser rather than the use of the rotating mirror of the prior art systems. One problem is that the laser has to be balanced or it will cause chattering which will cause trouble with focusing of the laser light on the very narrow 0.002 inch thick fiber ends. Also because of the high speed of rotation, for example, 6600 rpm, the laser weight must also be securely fastened or held in rigid position on the rotating carrier plate 312 and securely fastened in adjusted positions so that the laser light is focused on the fiber ends. That is the light emanating from the lens 342 and along the beam 344 shown in FIG. 14 must be focused on the fiber ends 346 of the transmit fibers 318 and held in this focused position while rotating at very high speed. There is considerable heat being generated because a couple of hundred millivolts of power is being generated by the laser. This heat must be dissipated. Another problem with rotating laser in the system using the lenses 342 and the highly polished ends 346 for the transmit fibers 318 is that of light being reflected back into the laser. This problem has been solved by tilting the laser slightly, for example, for about 4 degrees to about 8 degrees to lessen the amount of reflection of light back into the laser from the polished fiber ends. The reflected light into the laser will generate noise. In this illustrated embodiment, the rotating head weights about 1.5 ounces with the laser being about 8 to 9 ounces in weight.

A particular problem of adjustment of the laser 314 relative to the ends of the optical fibers 318 is that any adjustable mechanism should be light and inexpensive for shifting the laser to focus it as movement along a direction parallel to the rotational axis and the face of the fiber ends 346 of the transmit fibers 318. The other adjustment that is needed is to adjust the path of the light 344 so that it moves along a circular path which is substantially identical to the circle defined by the ends 346 of the transmit fibers 318. Stated differently, it is preferred that the axis of rotation of the carrier plate and the axis of the circle of the transmit fibers 318 be substantially identical, i.e., coaxial. In addition to the laser being repositioned radially and relative to its axis of rotation and also in an X-direction axially toward or from the optical fiber ends 346, it is most desirable that the adjustment be maintained against creeping or loss when rotating at 6600 rpm for extended periods of time. At high speed rotation, large centrifugal forces are generated. Also, it is desirable to secure the laser in position against shifting while the system is undergoing impact during a shipping of the system to its destination where it is to be used.

In accordance with the embodiment illustrated in FIGS. 26–29, the laser 314 is held in position and is adjusted into focus to match the circle diameter of the fiber ends 346 by a device which holds the laser in two places rather than the typical X and Y slide type of devices. Herein, the preferred adjustment device 700 comprises a pivoted laser mounting plate 702 which is a plate which carries the laser 314 for a pivotal movement about an end of a mounting plate 702 which is pivotally mounted on a fixed shaft 704 mounted on the circular carrier plate 312 that is rotated by the electric motor 310. The pivoted, laser mounting plate has an opposite end 708 opposite the pivot end 702 and this opposite end cooperates with a screw device 706 on the carrier plate 312. The screw device comprises a finely threaded shaft 714, threaded through a nut 716 (FIG. 27), carried on the pivotal laser mounting plate 702. Finely threaded shaft 714 has its opposite ends secured to and mounted in end mountings 718 and 720 which are fixedly secured to the rotatable carrier plate 312.

As will be explained in greater detail hereinafter, the three point locking system can be locked down directly without having any backlash as is present in the expensive X-slides and Y-slide systems in which the bearing tracks have play. That is, the X and Y-systems have linear bearings which will have play. Herein the finely threaded shaft 714 is provided with a large number of threads per inch, for example, eighty threads per inch.

Figure 27:
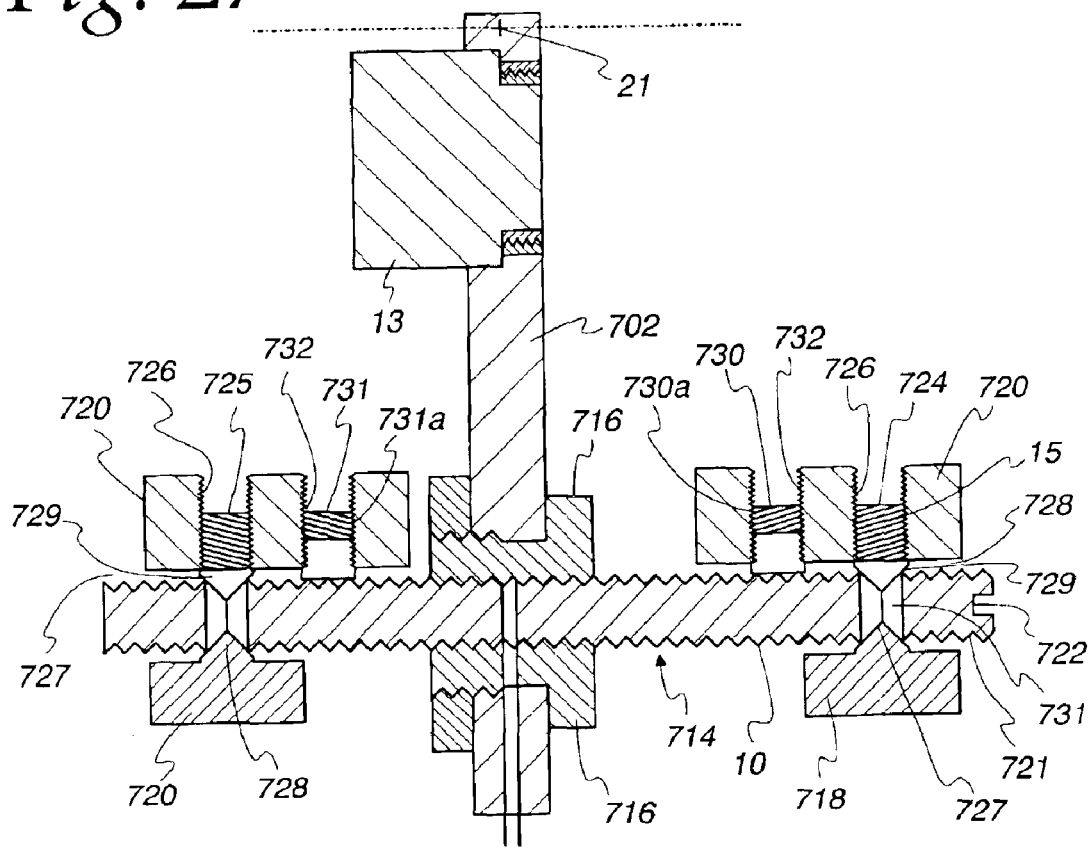
FIG. 27 is a cross-sectional view of the adjustment mechanism used to adjust the position of the laser.
Figure 28:
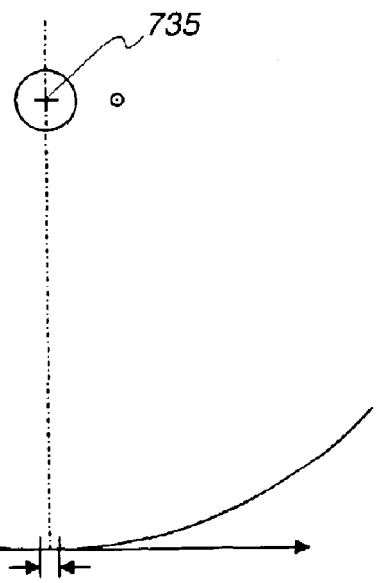
FIG. 28 is a diagrammatic view of shifting laser along a tangent of a circle using the adjustment mechanism of FIG. 27.

As best seen in FIG. 27, the opposite ends of the finely threaded shaft 714 are held in position by a pair of set screws 724 and 725 which are threaded into the threaded portions of the end mounting blocks 718 and 720 and by a pair of lock set screw plugs 730 and 731. The adjustment set screws 724 and each have conical ends 729 which are adapted to be positioned in annular V-shaped grooves 727 and 728 in opposite ends of shaft 714. Thus, in addition to the adjustment set screws 724, 725, there are also provided locking plastic plugs 730 and 731 mounted in the end mountings 718 and 720 having threaded ends 730a, 731a in threaded portions 732 of the end mountings for bearing against the finely threaded shaft to prevent its turning movement. These plastic plugs will not allow any turning when they are tightened. The V-shaped grooves 727 and 728 cooperate with the conical ends 729 of the respective set screws 724 and 725.

In order to move the axis 314a of laser 314 (FIG. 26) radially outwardly relative to the rotational axis 311a of the rotating shaft 311 and carrier plate 312, the upper end of the finely threaded shaft 714 in the upper end mounting 718 (as viewed in FIG. 26), which is the right end mounting in FIG. 27, is loosened by turning the set screw 724 and the locking plug 730 outwardly to allow the right end of the finely threaded shaft to be turned while the lower end of the shaft 714 is held against moving axially by the set screw 725 having its conical end in the grove 728. As a consequence of turning the finely threaded shaft in the nut 716, the laser mounting plate will pivot downwardly about the pivot shaft 714a for a small amount, e.g., in the range of 0.030 to 0.040 inch without binding. After shifting the axis 314a radially outwardly to increase the radial position of the laser light beam to match the circle of the fiber end 344, the set screw 724 is then tightened as is the plug 730 against the finely threaded shaft to hold it against turning during rotation or impacts during shipping.

To shift the axis 314a of the laser 314 radially inwardly toward the rotational axis 311a of the motor shaft 311 and carrier plate 312, the set screw 725 and locking plug 731 for the lower end mounting 720 (FIG. 26), which is the left end mounting 720 in FIG. 27, are loosened to allow turning of the shaft 714 threaded in the nut 716 on the laser mounting plate. The other end of the shaft 714 is still locked by the set screw 724 and plastic plug 730 which have not been loosened. As the lower end of the finely threaded shaft is turned in the nut 716, the laser mounting plate pivots upwardly about the shaft 714a to shift the axis 314a of the laser toward the rotational axis 311a thereby decreasing the radial distance between the laser center or axis 314a and the rotational axis 311a. Thus, the laser beam 344a (FIG. 31) may be moved, e.g., through 0.030 to 0.040 inch to its adjusted position. Then the lock plug 731 and set screw 725 are tightened against the shaft end in the end mounting 720 to lock the laser in its radially inward adjusted position.

To adjust the laser 314 along a path parallel to the rotational axis 311a to focus the light beam 344a (FIG. 31) directly on the optical fiber ends 346, the laser mounting plate 702 and laser 314 thereon, are moved relatively closer to or farther from the circular carrier plate 312 secured to the shaft 311a. The shaft 714a is identical to finely threaded shaft 714 (FIG. 27) and is held securely and loosened by the right hand portion of the locking mechanism shown in FIG. 27. The left hand portion of the finely threaded shaft and the left hand mounting block 720 are eliminated for the finely threaded shaft 714a.

More specifically, the end mounting block 718 for the shaft 714a is mounted on the carrier plate 312 and a nut 716 is carried on the laser mounting plate 702 with the finely threaded shaft 714a threaded through the nut. By loosening set screw 724 and locking plug 730 bearing against the shaft 714a, the shaft 714a may be turned in the nut 716a on the laser mounting plate to turn or pivot its end 708 about a center portion of the other finely threaded shaft 714. That is, when moving the left end (FIG. 26) of the laser mounting plate into or outwardly relative to the plane of the drawing shown in FIG. 26, this left hand end swings about the shaft 714 with the nut 716 (FIG. 26) turning on the threads of the shaft 714. The turning of the finely threaded shaft is through a very small distance, e.g., the maximum range of adjustment is about 0.030 to 0.040 inch for this embodiment. After adjustment by turning the shaft 714a either clockwise or counter-clockwise for the needed focusing adjustment to shift the laser closer or farther from the optical fiber ends 346, the set screw 724 and locking plug 730 are tightened against the shaft 714a to lock it in its adjusted position. The finely threaded shaft, e.g., 80 threads per inch in the nut 716a will not have any significant play as backlash.

Figure 29:
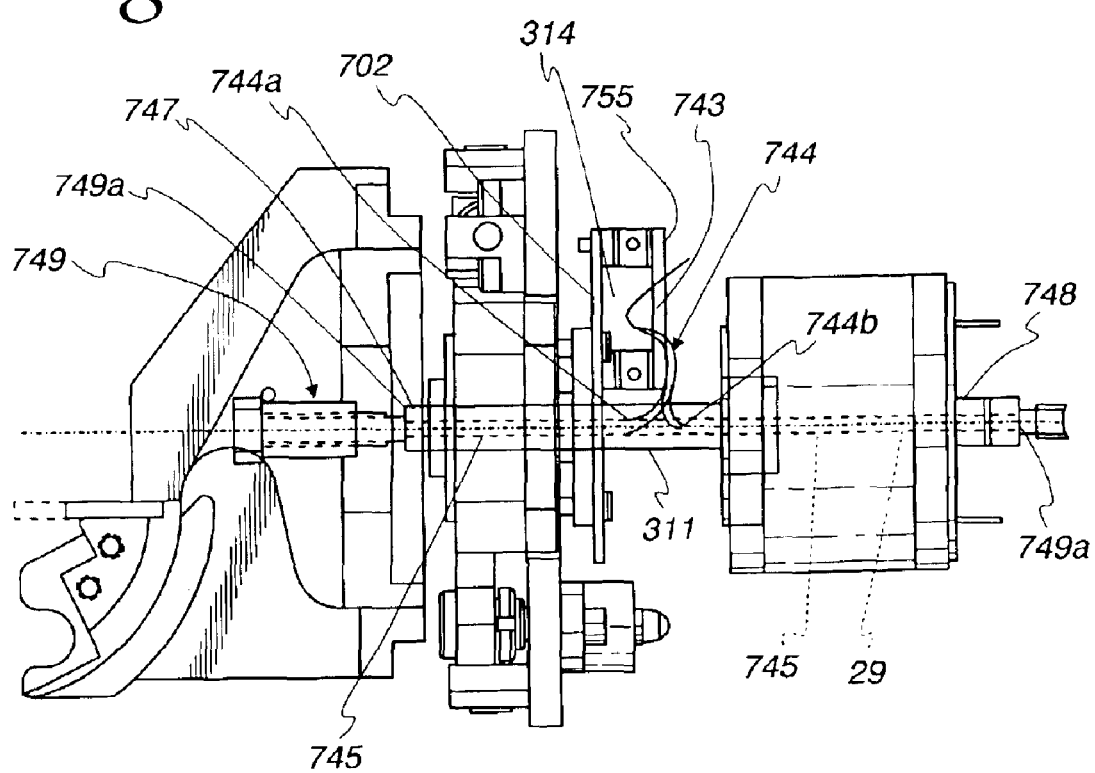
FIG. 29 is a view of an electrical power system for supplying power to the rotating laser.
Figure 30:
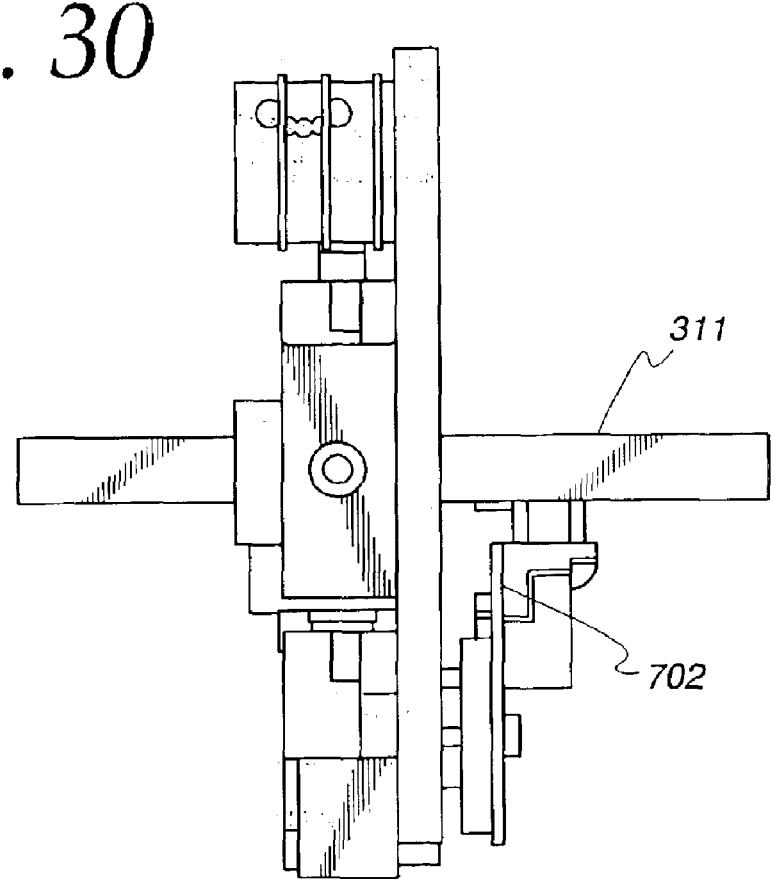
FIG. 30 is a side-elevational view of the rotating carrier plate and adjustment mechanism illustrated in FIG. 26.

Turning now to another aspect of the embodiment shown in FIG. 29, the laser head 314 is grounded and it is necessary to provide power to the laser head and to electrically insulate it. There is also a need to provide an inexpensive way for providing power to the rotating laser 314. As shown in FIG. 29, the laser head 314 is provided with a electrical connector 743 on the back end thereof to which are attached a pair of electrical, insulated wires or leads 744 with the leads extending into the hollow interior of the hollow supporting shaft 311 which rotates the laser. The is the shaft 311 has a hollow bore 745 coaxial with the center axis of the shaft with one electrical lead 744a extending to the left and the other electrical lead 744b extending to the right. The left lead extends through the hollow shaft and terminates at and is connected to a contact block 747 while the opposite electrical lead 744b extends to another contact block 748 which is mounted on a right end portion of the shaft 311 and is connected thereto. These rotating contact blocks are engaged by stationary contact brushes 749 which do not rotate and have wiping surfaces 749a engaging the respective rotating contact blocks 747 and 748. The contact brushes are mounted coaxially with the rotating shaft 311 and having their end faces engaging with the respective contact blocks 747 and 748 to supply power thereto. The preferred brushes 749 may be carbon brushes urged by springs into engagement with the contact blocks to have wiping contact therewith in a manner similar to wiping contact brushes in a distributor cap in an automobile distributor cap of an ignition system for a vehicle engine. This provides an inexpensive and relatively maintenance fee connection of power whereas slip rings or the like could be used; but they are more expensive and wear quickly. In addition to the laser head 314, the carrier plate also mounts a heat sink in the form of a copper block 755 (FIG. 29) mounted on the carrier plate 702 to rotate therewith as seen in FIG. 29. Herein, the copper plate weights about 4 ounces and dissipates heat generated by the laser. In addition there is a circuit board which has a power supply and a thermal control as well as a filter for filtering the power to make sure that the power supplied to the laser is as pure as can be possible.

Figure 16:
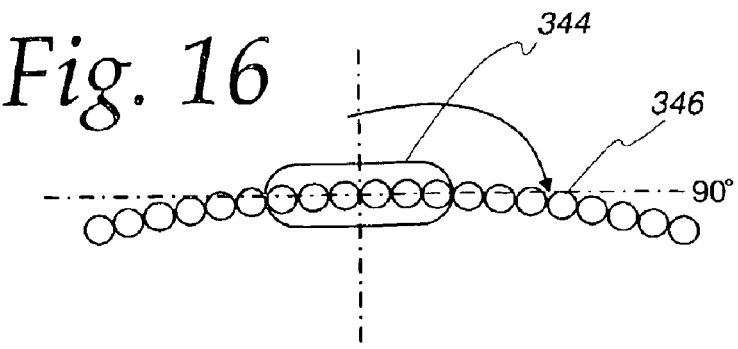
FIG. 16 is a representation of multiple fiber illumination in a low resolution, fast scanning mode.

In the illustrated embodiment of FIGS. 20–31, the laser head is tilted, e.g., at 8° to the axis 314a through the center of the laser head to have a straight line laser beam 344a (FIG. 31) that simultaneously is supplying the pumping light to at least two and preferably three optical fiber ends 346 of the optical fibers 318. The straight line laser beam 344a is tilted and is preferably a super thin beam that can be described as a straight line beam that extends across these fiber ends 346a, 346b and 346c simultaneously. If the beam is traveling in a clockwise direction, as shown by the directional arrows in FIG. 31, then the light beam 344a is hitting only a top upper portion of the upstream optical fiber end 346a. The light beam will be centered on the middle fiber end 346b which will be providing light through the fiber to the imaging plate causing the large phosphorescence which is being collected by the light guide 650. The light beam 344a will be hitting the lower portion of the downstream fiber end 346c. Thus, the laser is rotating very fast, e.g., 6600 rpm such that there is always a trailing light signal associated with the fiber end 346a and its associated transmit optical fiber 318 and another electrical signal of a minor amount associated with leading fiber end 346c. The main signal being generated is associated with the optical fiber 318 having its end 346b located centrally of the straight line beam 344a. The electrical signal being generated from light entering the fiber end 346c will be just starting as the electrical signal generated by the emanated light from the imaging plate will be shaped electronically. Thus, with this thin line beam 344a tilted to strike a plurality of fiber ends 346 simultaneously the emanated light never dies or drops to zero which causes complications with the electronic circuitry used to measure the emanated light to provide the high quality resolution needed for x-raying imaging. This straight line beam 344a that is tilted to sweep across the arcuate array of fiber ends 346 also helps in the tolerance available with respect to trying to match the laser beam's path to sweep the fiber ends. It will be appreciated that it is very difficult to precisely position each of 8000 fibers in a three inch circle with each fiber end 346 located exactly at the same identical radial distance from the center of this circle. Because the beam 344a extends above and below the circle, it will pump light into fiber ends located either slightly above or slightly below the nominal circular position. This is in contrast to the light beam 344 which is illustrated in FIG. 16 as being tangent to the circle of fiber ends 346. This straight, line thin beam 344a moving in a circular path is in contrast to a sinusoidal light beam from a rotating mirror of the prior art systems using a rotating mirror to provide pulsing light to the optical fiber ends.

Figure 31:
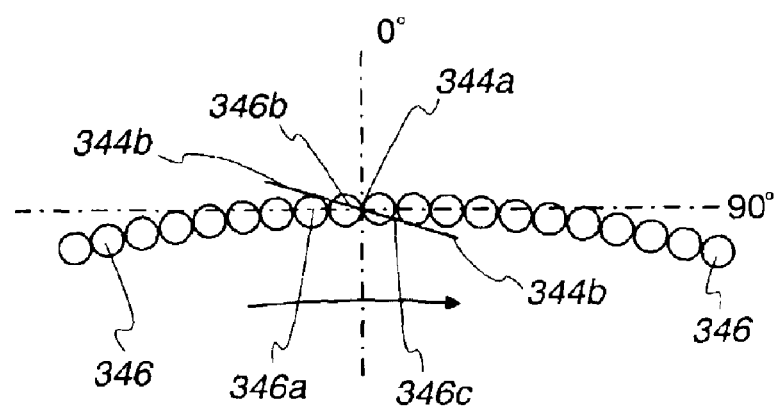
FIG. 31 is a representation of multiple fiber illumination by a thin line laser beam tilted across several optical fiber ends.

In the embodiment of FIG. 31, the laser light beam 344 has an inner end 344b located within the nominal circle to illuminate fiber ends having a radius less than the nominal radius for the circular array. The other end 344c of the thin line, light beam 344a is located radially outwardly of the circular array to illuminate optical fiber ends located a greater radial distance than the nominal radius for the circular array. Thus, by illuminating multiple fiber ends simultaneously and by illuminating fiber ends displaced slightly from the nominal radius of the circular array, no dead signal spots should occur and definition and resolution of the image are improved.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. Apparatus for radiographic imaging comprising:
   an optical laser for generating light;
   a plurality of delivery optical fibers for delivering the light from the laser to a radiographic medium, the optical fibers having light receiving ends positioned in an arc about an axis;
   an optical collector for receiving phosphorescent light from the radiographic medium stimulated by the light from the laser;
   an optical receiver for receiving the phosphorescent light from the optical collector and producing an optical signal in response thereto;
   a processor for generating an image signal responsive to the optical signal from the optical receiver; and
   a drive for rotating the laser about the axis of the arc and for delivering light the light receiving ends of the optical fibers without the use of rotating mirrors.

2. An apparatus for radiographic imaging according to claim 1 wherein:
   the optical fibers have an inlet ends arranged substantially in a circular array; and
   the optical fibers have outlet ends arranged in a linear array.

3. An apparatus in accordance with claim 2 wherein:
   the optical fibers deliver light generated by the laser in substantially a straight line without being sinusoidal in its path of travel across the linear array of outlet ends of the fibers.

4. An apparatus for radiographic imaging according to claim 2 wherein the optical fibers are positioned to receive an illumination light spot simultaneously across and illuminating several fiber ends, the light spot traveling across a portion of a first fiber end substantially fully across the central fiber end and leaving a trailing portion of a third fiber end.

5. An apparatus for radiographic imaging according to claim 4 wherein a signal is provided by integrating the illumination spot signal from the central fiber.

6. An apparatus for radiographic imaging according to claim 1 comprising:
   an adjustment device for adjusting the position of the axis of the rotating laser so that the axis of rotation of the laser substantially matches the axis of the arc of the optical fibers.

7. An apparatus for radiographic imaging according to claim 1 comprising:
   an adjustment device for shifting the optical laser along a path parallel to its rotational axis to provide focus of the illumination spot relative to the face of the optical fibers.

8. An apparatus for radiographic imaging according to claim 1 wherein an adjustment device is provided for holding the laser in three places while allowing radial adjustment in a direction parallel to the rotational axis to focus the illumination spot relative to the ends of the optical fibers.

9. An apparatus for radiographic imaging according to claim 1 wherein the optical collector comprises a light tube for receiving phosphorescent light from the radiographic medium and for delivering the light to the optical receiver.

10. An apparatus for radiographic imaging according to claim 9 wherein the light tube comprises:
    internal reflective surfaces for reflecting the light emanating from the radiographic medium back and forth relative to the optical receiver.

11. An apparatus in accordance with claim 1 wherein electrical power is delivered to the laser through a hollow shaft and is a brushed electrical contacting brushes in contact with the shaft.

12. In an apparatus for radiographic imaging, the combination comprising:
    a rotating optical laser for generating pumping light;
    a rotatable carrier for carrying the laser in a circular path about a rotational axis for the carrier;
    a plurality of optical fibers having ends disposed in an arc about the axis to receive pumping light and for delivering the pumping light to a radiographic medium;
    a laser mount on the rotatable carrier on which the laser is mounted;
    a first adjustment screw device extending between the rotatable carrier and the laser mount and mounting the carrier plate and turnable to shift the laser mount toward or from the optical fiber ends in order to adjust the focus of the laser beam on the optical fiber ends; and
    a second adjustment screw device extending between the rotatable carrier and the laser mount and turnable to shift the laser mount and the laser radially inwardly or outwardly to match the circular path of the laser beam to the arc defined by the optical fiber ends.

13. An apparatus in accordance with claim 12 when a first adjustment screw in the first adjustment screw device pivotally mounts the carrier for pivoting when turning the second adjustment screw device.

14. An apparatus in accordance with claim 12 wherein a second adjustment screw in the second adjustment screw device pivotally mounts the carrier for pivoting when turning the first adjustment screw device.

15. An apparatus in accordance with claim 14 wherein a first adjustment in the first adjustment device pivotally mounts the carrier for pivoting when turning the second adjustment device.

* * * * *

UNITED STATES PATENT AND TRADEMARK OFFICE
CERTIFICATE OF CORRECTION

PATENT NO. : 6,894,303 B2  
DATED : May 17, 2005  
INVENTOR(S) : Troy W. Livingston It is certified that error appears in the above-identified patent and that said Letters Patent is hereby corrected as shown below:

Column 21,  
Line 62, after "delivering" insert -- to --;  
Line 66, change "ends" to -- end --; and Column 22,  
Line 47, delete "is a brushed".

Signed and Sealed this

Sixteenth Day of May, 2006

JON W. DUDAS  
*Director of the United States Patent and Trademark Office*